United States Patent
Clements et al.

(10) Patent No.: US 10,359,141 B2
(45) Date of Patent: Jul. 23, 2019

(54) TUBE FITTING

(71) Applicant: The Boeing Company, Chicago, IL (US)

(72) Inventors: Ronald L. Clements, Kent, WA (US); Brent M. Campbell, Seattle, WA (US); Alexandra N. Sonnabend, Seattle, WA (US); Tammy L. McLeod, Renton, WA (US); Son T. Nguyen, Renton, WA (US); Christian J. Tom, Renton, WA (US)

(73) Assignee: The Boeing Company, Chicago, IL (US)

( * ) Notice: Subject to any disclaimer, the term of this patent is extended or adjusted under 35 U.S.C. 154(b) by 951 days.

(21) Appl. No.: 14/501,688

(22) Filed: Sep. 30, 2014

(65) Prior Publication Data

US 2015/0198278 A1    Jul. 16, 2015

Related U.S. Application Data

(63) Continuation-in-part of application No. 14/154,377, filed on Jan. 14, 2014.

(51) Int. Cl.
  *F16L 37/138*  (2006.01)
  *F16L 19/00*  (2006.01)
  *F16L 19/025*  (2006.01)

(52) U.S. Cl.
  CPC .......... *F16L 37/138* (2013.01); *F16L 19/005* (2013.01); *F16L 19/025* (2013.01); *F16L 2201/10* (2013.01); *Y10T 29/49863* (2015.01)

(58) Field of Classification Search
  CPC ...... F16L 37/138; F16L 37/088; F16L 19/025; F16L 19/005; F16L 2201/10
  (Continued)

(56) References Cited

U.S. PATENT DOCUMENTS

| 1,069,916 A | 8/1913 | Windsor |
| 4,451,069 A | 5/1984 | Melone |

(Continued)

FOREIGN PATENT DOCUMENTS

| DE | 19516096 | 11/1996 |
| EP | 728977 | 8/1996 |

(Continued)

OTHER PUBLICATIONS

Eaton Aerospace Group. "Aeroquip Sure-Mate Couplings", Mar. 2013.

(Continued)

*Primary Examiner* — Greg Binda
*Assistant Examiner* — Zachary T Dragicevich
(74) *Attorney, Agent, or Firm* — Perman & Green, LLP

(57) ABSTRACT

A tube fitting includes a first coupling member having at least a snap coupling, a second coupling member having a first quick-connect side with a mating snap coupling disposed at a first end of the second coupling member, and at least one elastomeric seal disposed on the second coupling member, and a sleeve member configured to interface with the first coupling member and the at least one elastomeric seal, wherein the sleeve member is disposed between and retained by the first coupling member and the second coupling member and the snap coupling and mating snap coupling effect coupling of the first coupling member and the second coupling member.

20 Claims, 16 Drawing Sheets

(58) Field of Classification Search
USPC ...... 285/92, 354, 91, 81, 305, 921, 307, 359
See application file for complete search history.

(56) References Cited

U.S. PATENT DOCUMENTS

| | | | |
|---|---|---|---|
| 4,781,400 A | | 11/1988 | Cunningham |
| 5,226,682 A | * | 7/1993 | Marrison ............... F16L 37/088 285/92 X |
| 5,350,200 A | * | 9/1994 | Peterson ............... F16L 19/005 285/92 X |
| 5,388,866 A | | 2/1995 | Schlosser |
| 5,553,895 A | * | 9/1996 | Karl ...................... F16L 37/088 285/921 X |
| 5,752,726 A | | 5/1998 | Fixemer |
| 5,823,702 A | | 10/1998 | Bynum |
| 5,890,746 A | | 4/1999 | Mueller |
| 6,155,607 A | | 12/2000 | Hewitt et al. |
| 6,302,447 B1 | | 10/2001 | Lee |
| 6,494,494 B2 | * | 12/2002 | Vogel .................... F16L 37/088 |
| 6,517,119 B2 | | 2/2003 | Thomas |
| 6,916,988 B1 | | 7/2005 | Auray et al. |
| 7,000,953 B2 | | 2/2006 | Berghaus |
| 7,681,925 B2 | | 3/2010 | Lambert et al. |
| 7,914,050 B2 | * | 3/2011 | Udhofer ................ F16L 37/088 |
| 8,641,099 B2 | | 2/2014 | Cuva et al. |
| 8,777,931 B2 | | 7/2014 | Davis et al. |
| 2004/0056481 A1 | | 3/2004 | Do et al. |
| 2007/0052234 A1 | | 3/2007 | Breay |
| 2007/0164566 A1 | | 7/2007 | Patel |
| 2010/0270795 A1 | | 10/2010 | Itou et al. |
| 2014/0008908 A1 | | 1/2014 | Cuva et al. |

FOREIGN PATENT DOCUMENTS

| | | |
|---|---|---|
| EP | 1703191 | 9/2006 |
| EP | 2224155 | 9/2010 |
| JP | 09152068 | 6/1997 |
| JP | 2008038924 | 2/2008 |
| JP | 2009150450 | 7/2009 |
| JP | 3175517 | 5/2012 |
| WO | 0077434 | 12/2000 |
| WO | 2013162150 | 10/2013 |

OTHER PUBLICATIONS

Eaton Hydraulics. "Eaton STC Connectors Catalog", May 2013.
Shur-lok Company. "Fluid Dittings: Flareless Tube End", 2012.
The Parker Fluid Connectors Group. "Parker Universal Push-to-Connect". Parker Hannifin Corporation, Aug. 2012 Bulletin 4017-1 (UK).
Tube Fitting Division "Universal Push-to-Connect Assembly". Parker Hannifin Corporation, Feb. 2008.
McCorkle, D. "Fluid Coupling" Shur-lok Corporation Technical Sales Bulletin, TSB0003, Sep. 1998.
The Oetiker Group. "Quick Connectors". www.oetiker.com, Jun. 2012.
European Search Report, European Application No. 14198169, dated May 12, 2015.
International Search Report, International Application No. EP 15152782, dated May 11, 2015.
Japanese Office Action dated Dec. 4, 2018; Japanese application JP2015002274.

* cited by examiner

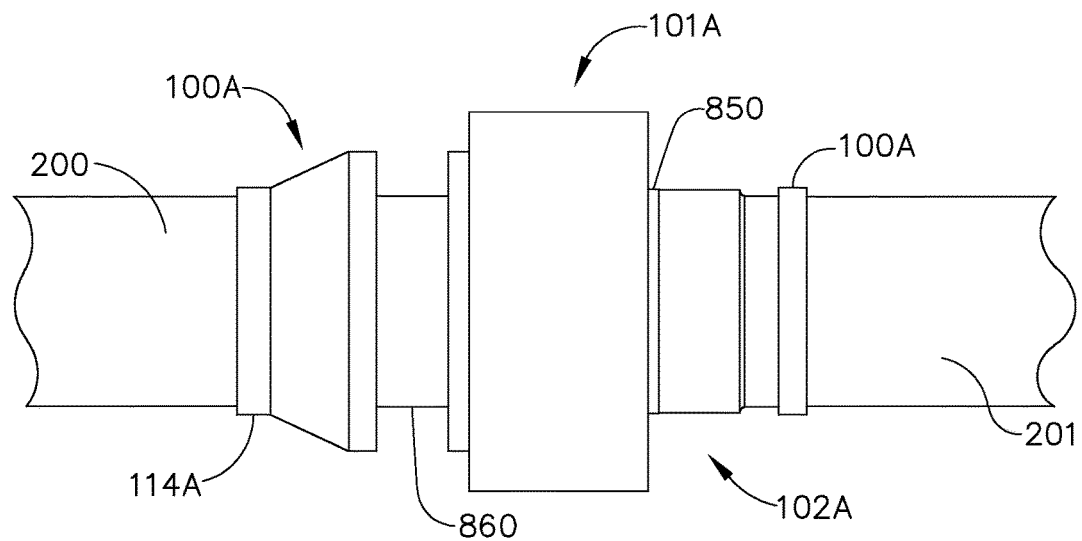
FIG. 13
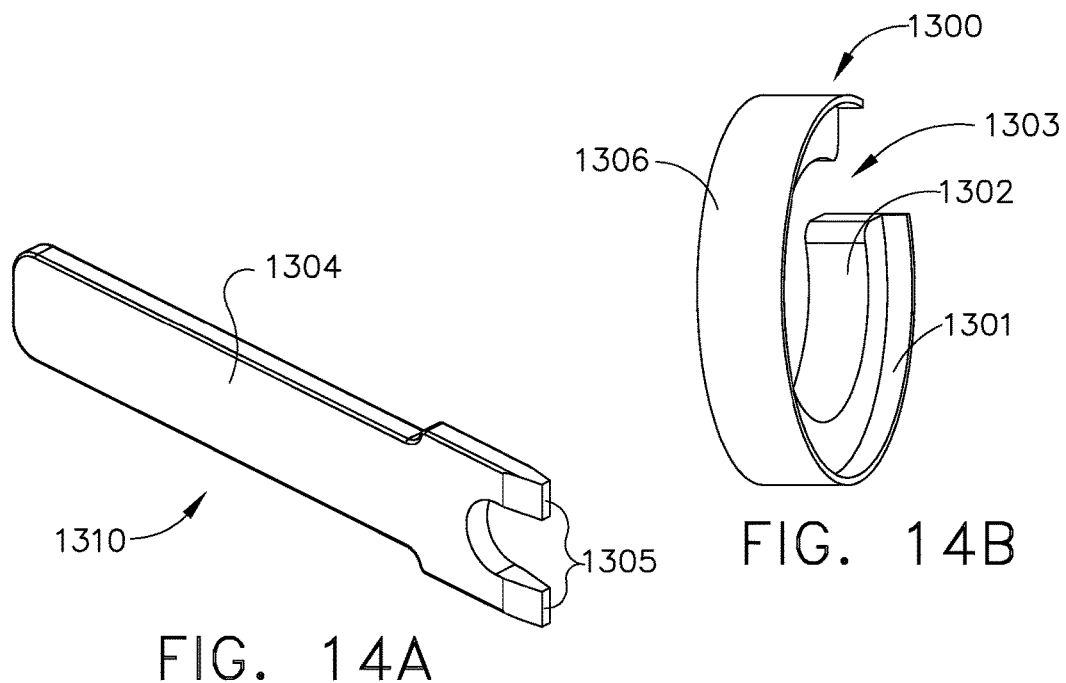
FIG. 14A
FIG. 14B

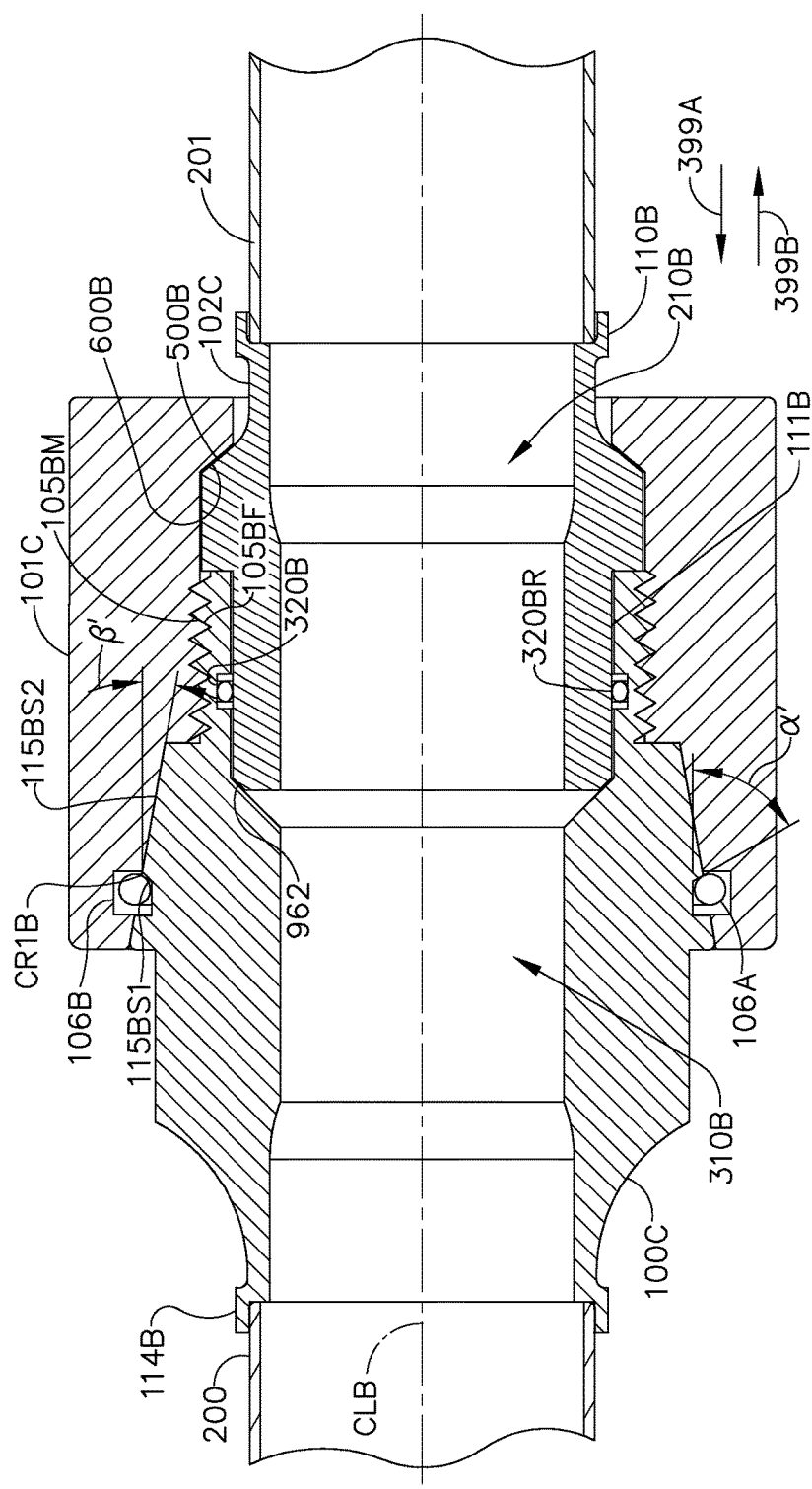
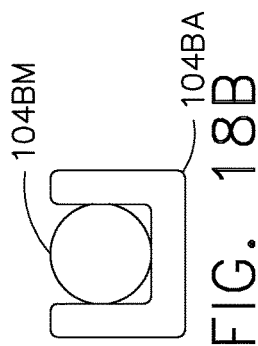
FIG. 18
FIG. 18A
FIG. 18B

TUBE FITTING

CROSS-REFERENCE TO RELATED APPLICATIONS

This application is a continuation-in-part of and claims the benefit of non-provisional patent application Ser. No. 14/154,377 filed on Jan. 14, 2014 the disclosure of which is incorporated herein by reference in its entirety.

BACKGROUND

1. Field

The exemplary embodiments generally relate to tubing connections and, more particularly, to quick connect tubing connections.

2. Brief Description of Related Developments

Generally tubing connections, couplings or fittings include a male and a female connection member that are fastened together. In one example, the male and female connection member may be fastened together by threading the male connection member onto the female member to a predetermined torque using tools such as, for example, wrenches. In other examples, the tubing connection may be a quick-connect coupling where the male and female connection members may be pressed together (e.g. with or without tools) so that locking features of the male connection member engage corresponding locking features of the female connection member.

When assembling the male and female connection members mechanics may apply an improper torque (e.g. over or under torqued) to the tubing connection which may hinder the effectiveness of the connection. In addition there may be ergonomic effects of assembling the tubing connections due to, for example, high torque values for metal on metal seals. The threaded and quick connect tubing connections may not allow installation in hard-to-reach or limited space applications and may not provide an indication of when a proper connection is made leading to prolonged assembly times for coupling two pieces of tubing.

It would be advantageous to provide a quick connect tubing connection that addresses one or more of the aspects described above.

SUMMARY

A tube fitting including a first coupling member having at least a snap coupling, and a second coupling member having a first quick-connect side having a mating snap coupling disposed at a first end of the second coupling member, and a second quick-connect side configured for threaded engagement disposed at a second end of the second coupling member, the second end being opposite the first end, wherein the mating snap coupling is configured to engage the snap coupling to effect coupling of the first and second coupling member.

A tube fitting including a first fitting member having a body including a shoulder portion, a second fitting member having a body including a gripping portion and a plurality of tines extending from the body, the plurality of tines being configured to engage the shoulder, a third fitting member disposed between the first fitting member and second fitting member, and at least one elastomeric seal disposed between the first fitting member and the third fitting member.

A method for connecting tubing where the method includes aligning a first side tube fitting member with a second side tube fitting member, positioning at least one elastomeric seal member between the first and second side fitting members, moving the first side tube fitting member and the second side tube fitting member together to at least partially compress the at least one elastomeric seal member, and engaging a third fitting member with the first side fitting member such that a seal formed by the at least one elastomeric seal member between the first side fitting member and the second side fitting is maintained through engagement between an angled surface of a tine portion of the third fitting member and an angled surface of a shoulder portion of the first side tube fitting.

A tube fitting including a first coupling member having at least a snap coupling, a sleeve member having at least one elastomeric seal disposed on the sleeve member and configured to interface with the first coupling member, and a second coupling member having a quick-connect side with a mating snap coupling disposed at the first quick-connect side, wherein the sleeve member is disposed between and retained by the first and second coupling members and the snap coupling and mating snap coupling effect coupling of the first and second coupling members.

A tube fitting including a first fitting member having a body with a shoulder portion, a second fitting member having a body and a snap coupling member included within the body, the coupling member being configured to engage the shoulder portion to effect coupling of the first and second fitting members, a third fitting member disposed between the first fitting member and the second fitting member, and at least one elastomeric seal disposed on the third fitting member and being configured to interface with the first fitting member.

A method for connecting tubing where the method includes aligning a first side tube fitting member with a second side tube fitting member, positioning at least one elastomeric seal member on the second side tube fitting member, moving the first side tube fitting member and the second side tube fitting member together to at least partially compress the at least one elastomeric seal member radially between the first and second side tube fitting members, and engaging a third fitting member with the first side tube fitting member such that a seal, formed by the at least one elastomeric seal member between the first side tube fitting member and the second side tube fitting member, is maintained through engagement of a coupling member of the third side tube fitting member and a shoulder portion of the first side tube fitting member.

A tube fitting includes a first coupling member having at least a snap coupling, a second coupling member having a first quick-connect side with a mating snap coupling disposed at a first end of the second coupling member, and at least one elastomeric seal disposed on the second coupling member, and a sleeve member configured to interface with the first coupling member and the at least one elastomeric seal, wherein the sleeve member is disposed between and retained by the first and second coupling members and the snap coupling and mating snap coupling effect coupling of the first and second coupling members.

A tube fitting includes a first fitting member having a body with a shoulder portion, a second fitting member having a body and a snap coupling member included within the body, the snap coupling member being configured to engage the shoulder portion to effect coupling of the first and second fitting members; a third fitting member disposed between the first fitting member and the second fitting member, and at least one elastomeric seal disposed on the first fitting member and being configured to interface with the third fitting member.

A method for connecting tubing includes aligning a first side tube fitting member with a second side tube fitting member; positioning at least one elastomeric seal member on the first side tube fitting member, moving the first side tube fitting member and the second side tube fitting member together to at least partially compress the at least one elastomeric seal member radially between the first and second side tube fitting members, and engaging a third fitting member with the first side tube fitting member such that a seal, formed by the at least one elastomeric seal member between the first side tube fitting member and the second side tube fitting member, is maintained through engagement of a coupling member of the third side tube fitting member and a shoulder portion of the first side tube fitting member.

BRIEF DESCRIPTION OF THE DRAWINGS

The foregoing aspects and other features of the disclosed embodiment are explained in the following description, taken in connection with the accompanying drawings, wherein:

FIG. 13 is a schematic illustration of the tube fitting of FIG. 9 in accordance with aspects of the disclosed embodiment;

FIG. 14A is a schematic illustration of a decoupling tool in accordance with aspects of the disclosed embodiment;

FIG. 14B is another schematic illustration of a decoupling tool in accordance with aspects of the disclosed embodiment;

FIG. 18 is a schematic illustration of a tube fitting in accordance with aspects of the disclose embodiment;

FIGS. 18A and 18B are schematic illustration of portions of a tube fitting in accordance with aspects of the disclosed embodiment;

DETAILED DESCRIPTION

Figure 20:
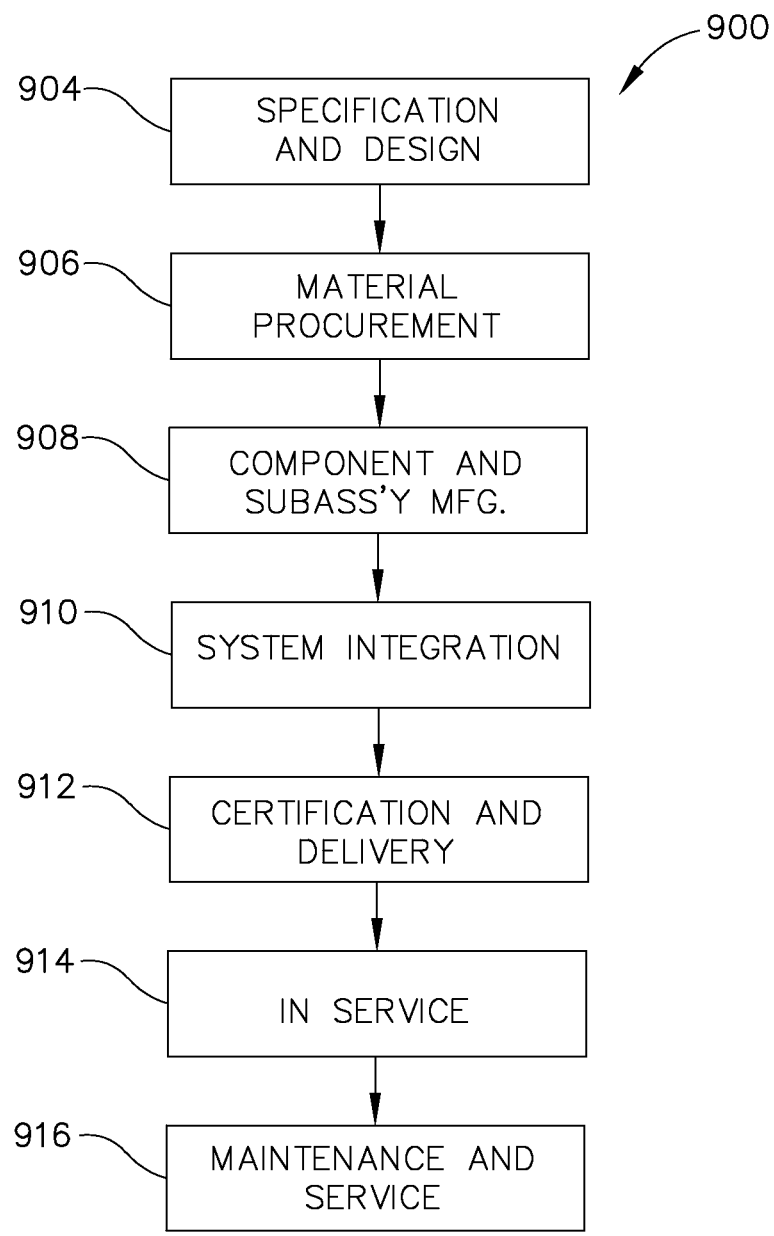
FIG. 20 is a flow diagram of aircraft production and service methodology in accordance with aspects of the disclosed embodiment.
Figure 21:
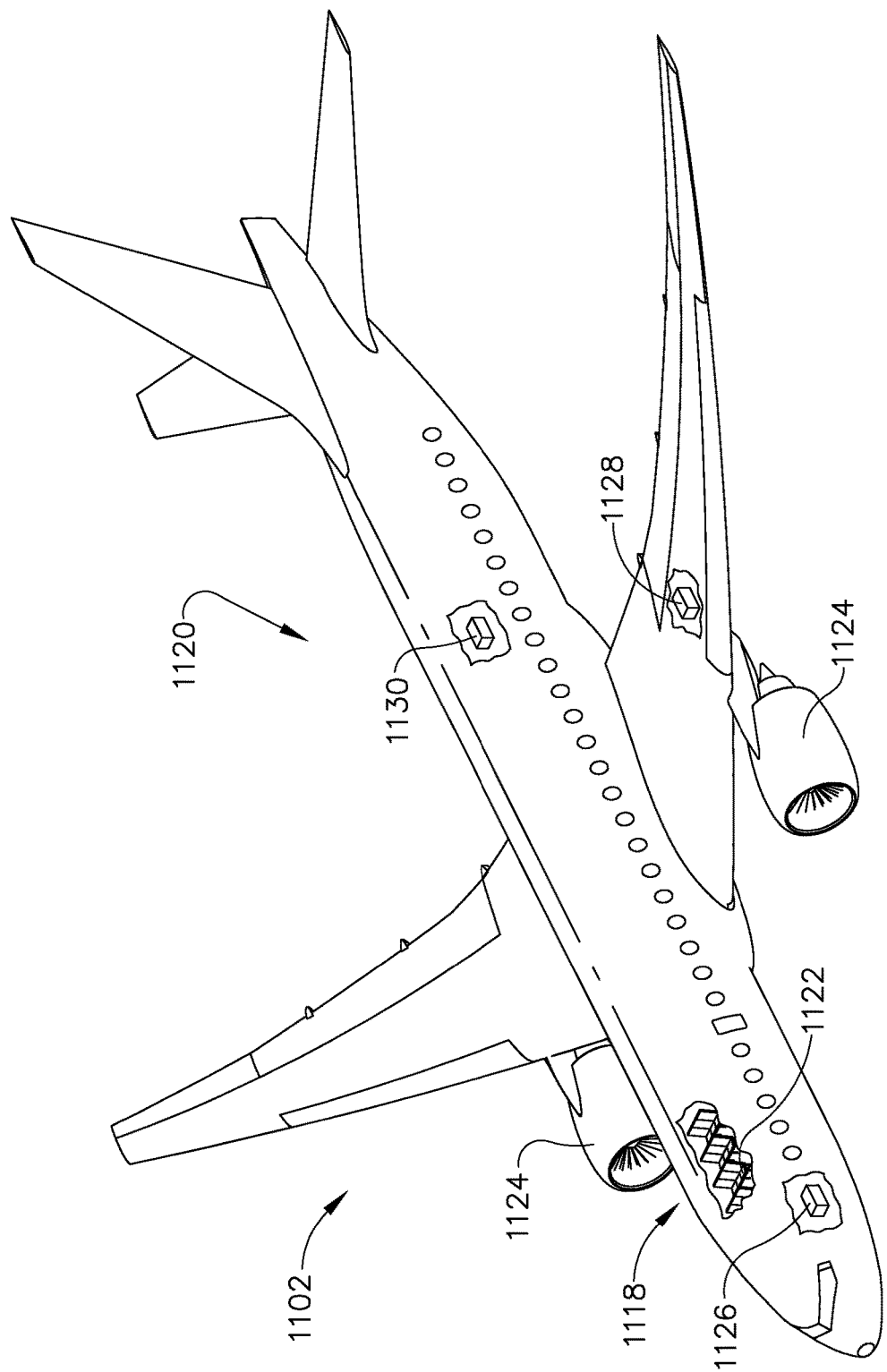
FIG. 21 is a schematic illustration of an aircraft incorporating features of the disclosed embodiment.

Examples of the disclosure may be described in the context of an aircraft manufacturing and service method 900 as shown in FIG. 20 and an aircraft 1102 as shown in FIG. 21. During pre-production, the illustrative method 900 may include specification and design 904 of the aircraft 1102 and material procurement 906. During production, component and subassembly manufacturing 908 and system integration 910 of the aircraft 1102 take place. Thereafter, the aircraft 1102 may go through certification and delivery 912 to be placed in service 914. While in service by a customer, the aircraft 1102 is scheduled for routine maintenance and service 916 (which may also include modification, reconfiguration, refurbishment, and so on).

Each of the processes of the illustrative method 900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 21, the aircraft 1102 produced by the illustrative method 900 may include an airframe 1118 with a plurality of high-level systems 1120 and an interior 1122. Examples of high-level systems 1120 include one or more of a propulsion system 1124, an electrical system 1126, a hydraulic system 1128, and an environmental system 1130. Any number of other systems may be included. Although an aerospace example is shown, the principles of the disclosure may be applied to other industries, such as the automotive and ship-building industries, among others.

Apparatus and methods shown or described herein may be employed during any one or more of the stages of the manufacturing and service method 900. For example, components or subassemblies corresponding to component and subassembly manufacturing 908 may be fabricated or manufactured in a manner similar to components or subassemblies produced while the aircraft 1102 is in service. Also, one or more aspects of the apparatus, method, or a combination thereof may be utilized during the production stages 908 and 910, for example, by substantially expediting assembly of or reducing the cost of the aircraft 1102. Similarly, one or more aspects of the apparatus or method realizations, or a combination thereof may be utilized, for example and without limitation, while the aircraft 1102 is in service, e.g., maintenance and service 916.

Figure 1:
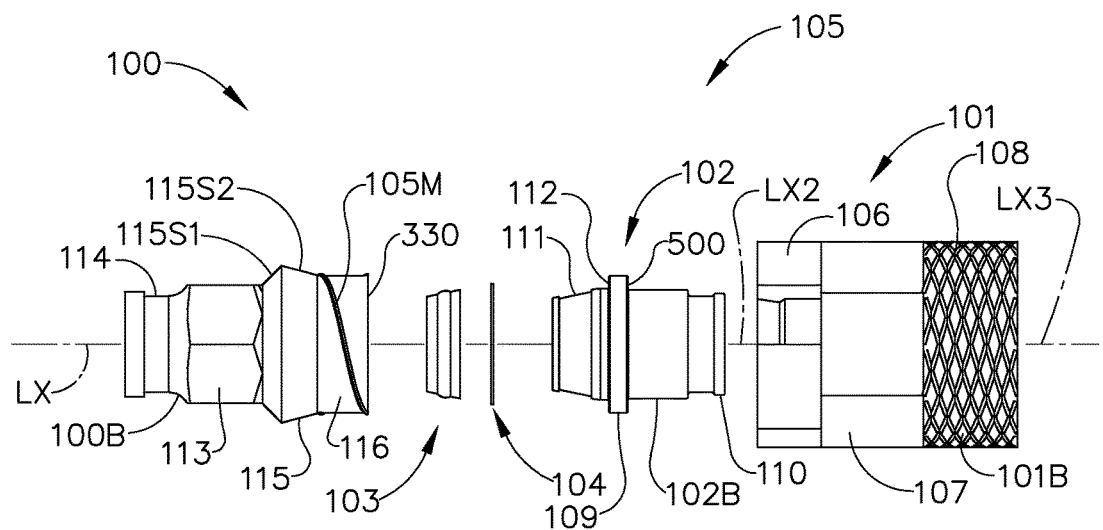
FIG. 1 is a schematic illustration of a tube fitting in accordance with aspects of the disclose embodiment.
Figure 2:
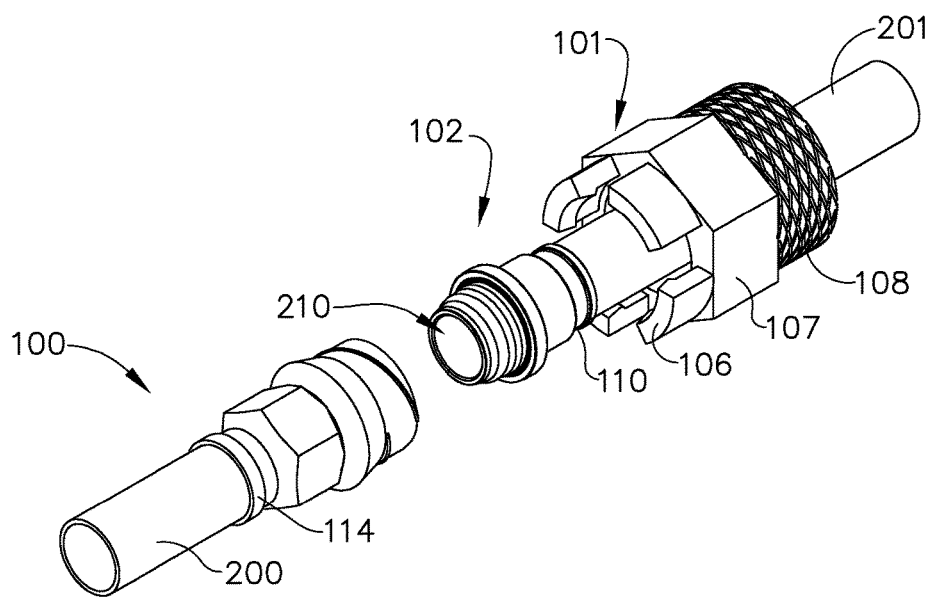
FIG. 2 is a schematic illustration of the tube fitting of FIG. 1 in accordance with aspects of the disclosed embodiment.

FIG. 1 is a schematic illustration of a tube fitting 105 in accordance with aspects of the disclose embodiment. Although the aspects of the disclosed embodiment will be described with reference to the drawings, it should be understood that the aspects of the disclosed embodiment can be embodied in many forms. In addition, any suitable size, shape or type of elements or materials could be used.

In one aspect the tube fitting 105 may be a quick-connect or easy-snap fitting. The tube fitting 105 may not need tools to install or otherwise connect the tube fitting members 100, 101, 102 (e.g. provides a tool-less installation as will be described below) where standard tools are used to disconnect or otherwise uninstall the tube fitting members. The tube fitting 105 may allow for reduced installation times, such as when compared to threaded compression fittings or other conventional fittings, while providing a re-connectable fitting that can be installed in, for example, any suitable aircraft 1102 (FIG. 21) or other vehicle that includes tube connectors for hydraulic, pneumatic or other suitable fluidic systems. In one aspect the tube fitting 105 may be provided for installation on existing tubing where one or more of the tube fitting members 100, 101, 102 may be coupled to or otherwise installed on any existing tubing in any suitable manner, such as by crimping, swaging, soldering, welding, etc. In other aspects the tube fitting 105 may be preinstalled on tubing where the tubing/fitting assembly is installed as a unit within, for example, the aircraft 1102. As will also be described in greater detail below the tube fitting may include one or more elastomeric seals and have a configuration that provides for positive low force seals.

Referring also to FIGS. 2-6 in one aspect the tube fitting 105 includes a first side fitting member or union 100, a second side fitting member or sleeve 102 and a coupling member or nut 101. The union 100, sleeve 102 and nut 101 may be constructed of any suitable metal, plastic, composite or any other suitable material.

Figure 6:
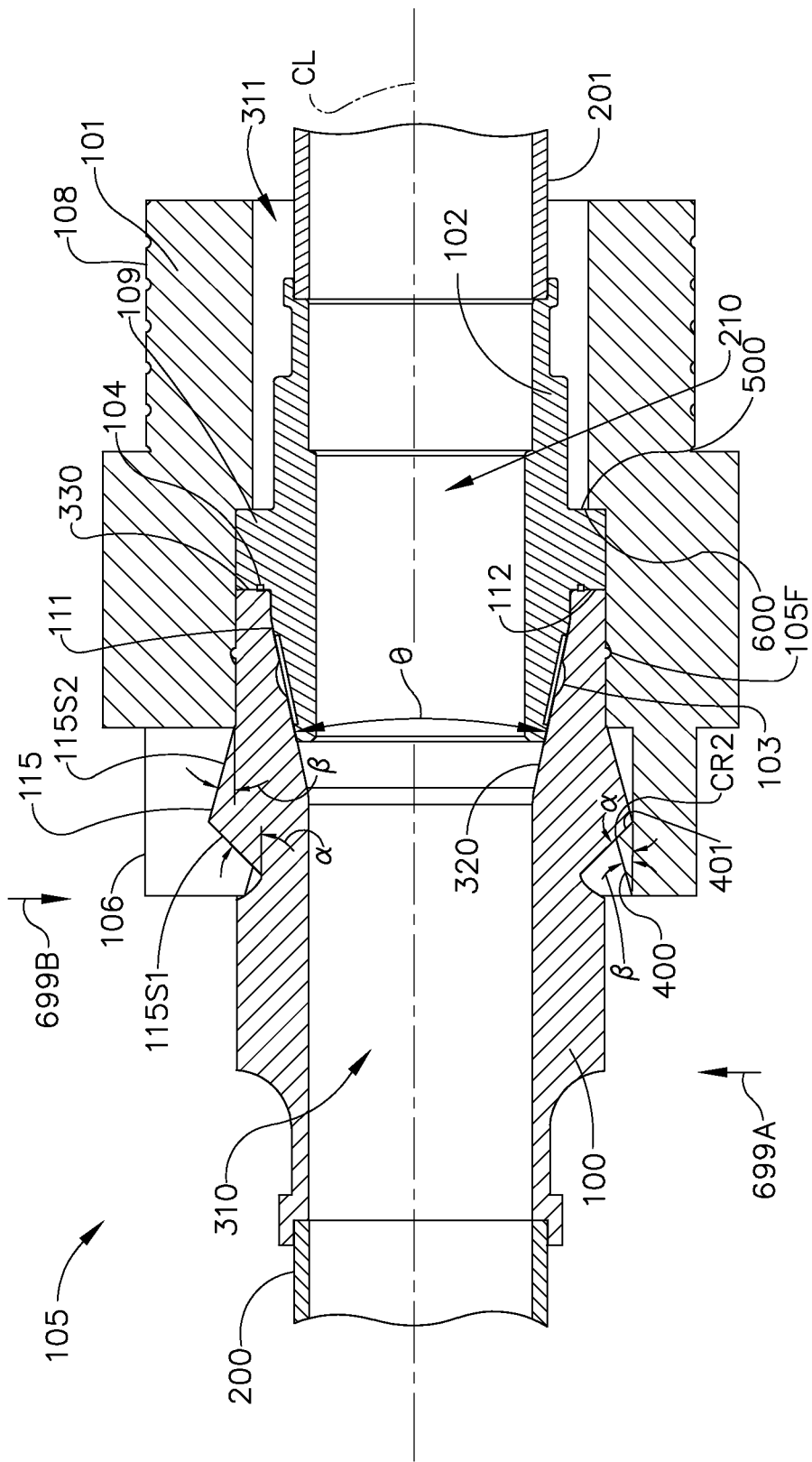
FIG. 6 is a schematic sectional view of the tube fitting of FIG. 1 in accordance with aspects of the disclosed embodiment.

The union 100 includes a generally cylindrical body 100B having an internal passage 310 extending along a longitudinal axis or centerline LX of the body 100B. The union 100 may also include a tubing engagement portion 114, one or more flats 113, a shoulder portion 115 and a seal portion 116 axially arranged or spaced along the body. The internal passage 310 may extend through the body 100B for allowing fluid to pass through the union 100. The tubing engagement portion 114 may be disposed at a first end of the union 100 and be configured for coupling the union 100 to any suitable tubing 200. In one aspect the tubing engagement portion may be configured such that the tubing 200 is inserted into the internal passage 310 and the tubing engagement portion is secured to the tubing in any suitable manner substantially similar to that described above. In other aspects the tubing 200 may be secured to the union 100 in any suitable manner. The one or more flats 113 may be any suitable flats or surfaces configured to allow any suitable tool, such as a wrench, to engage the union for connecting or disconnecting the tube fitting members 100, 101, 102 as will be described below. The shoulder portion 115 may include a first angled surface or disengagement ramp 115S1 and an opposing second angled surface or engagement ramp 115S2. As can be seen in FIG. 6, an angle β of the engagement ramp 115S2 (e.g. relative to the longitudinal axes or centerline LX) may be shallower or less than an angle α of the disengagement ramp 115S1 (e.g. relative to the longitudinal axes or centerline LX). The seal portion 116 may disposed at a second end of the union 100 and include one or more fastening members or features 105M configured to provide mechanical assistance when coupling the tube fitting members 100, 101, 102 together. In one aspect the fastening members 105M may include one or more threads having any suitable pitch. For example, the threads may be quarter-turn or half-turn threads that allow for coupling of the tube fitting member 100, 101, 102 with a quarter or half turn of, for example, the nut 101 relative to the union 100. In other aspects the threads may have any suitable pitch for coupling the tube fitting members with any suitable relative rotation amount between, for example, the union 100 and the nut 101. In still other aspects fastening members 105M may not be provided. As can be seen best in FIG. 3, the seal portion 116 may include a first seal surface 320 formed in a wall of the internal passage 310. The first seal surface 320 may be a conical surface having any suitable angle θ. In one aspect the first seal surface 320 may form a conical surface having an angle θ of about 24° while in other aspects the angle θ may be more or less than about 24°. The seal portion 116 may also include a second seal surface 330 at an end face of the seal portion 116. In other aspects the first seal surface 320 may have any suitable shape and or configuration such as an acorn shaped surface or parabolic surface having any suitable angled surface(s).

Figure 5:
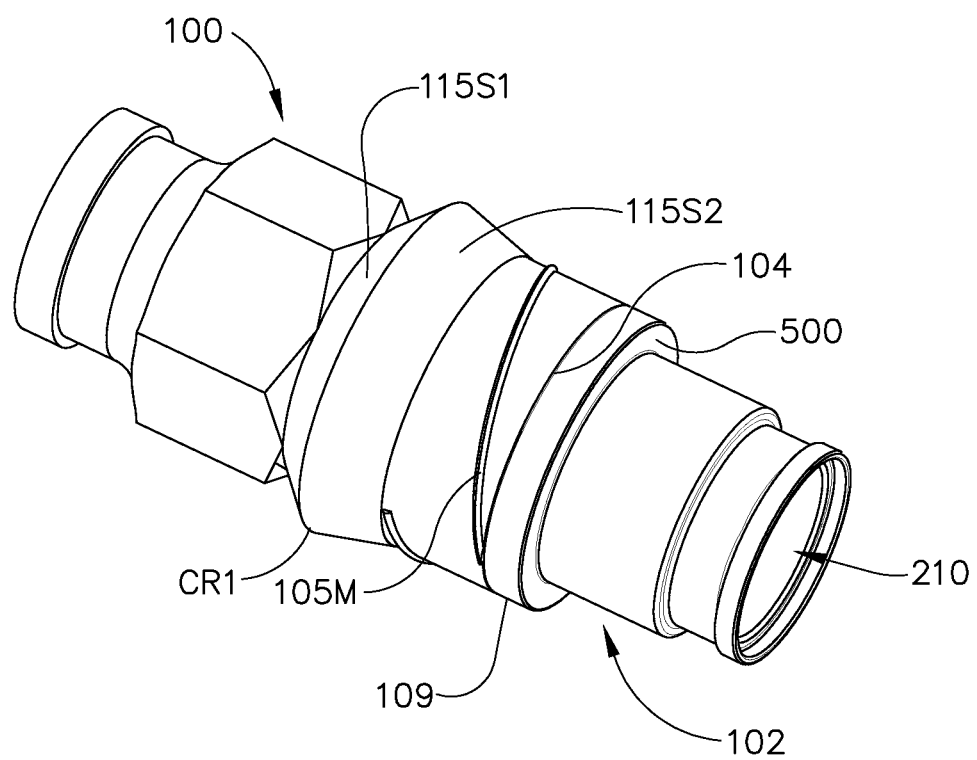
FIG. 5 is a schematic illustration of a portion of the tube fitting of FIG. 1 in accordance with aspects of the disclosed embodiment.

In one aspect the sleeve 102 includes a generally cylindrical body 102B having an internal passage 210 extending along a longitudinal axis or centerline LX2 of the body 102B. The sleeve 102 may also include a tubing engagement portion 110, a flange 109 and a seal portion 111 axially arranged or spaced along the body 102B. The internal passage 210 may extend through the body 102B for allowing fluid to pass through the sleeve 102. The tubing engagement portion 110 may be located at a first end of the sleeve 102 and may be substantially similar to tubing engagement portion 114 of the union 100 for securing the sleeve 102 to any suitable tubing 201 in any suitable manner such as described above. The flange 109 may extend radially from a peripheral surface of the tubing engagement portion 110 and include an engagement surface 500 and a flange sealing surface 112. The seal portion 111 may be disposed at a second end of the sleeve 102 and form a conical sealing surface where the conical angle of the seal portion 111 corresponds to the conical angle θ of the first seal surface 320 of the union 100 for allowing sealing engagement between the union 100 and sleeve 102. In one aspect the angle θ may allow for positive low force seals when the longitudinal axes LX, LX2 of the union 100 and sleeve 101 are substantially aligned or misaligned by up to about 2°. In other aspects the angle θ may allow for low force seals when the longitudinal axes LX, LX1 are misaligned by an angle greater than about 2°. In other aspects the seal portion 111 may have any suitable shape and or configuration such as an acorn shaped surface or parabolic surface. In still other aspects the angle of the first seal surface 320 and the angle of the seal portion 111 may be different. As can be seen in FIG. 1, a first elastomeric member 103, such as a conical seal member or a seal member having any suitable shape and/or configuration, may be placed over or otherwise affixed to the surface of seal portion 111 such that when seal portion 111 is inserted into the union 100 the first elastomeric member 103 engages both seal surface 320 and the surface of seal portion 111 to form a first fitting seal. A second elastomeric member 104 may be placed against seal surface 112 of the flange 109 or at least partly within the flange (e.g. such as in a recessed groove or slot) such that when the union 100 and sleeve 102 are engaged or otherwise fitted together (as best seen in FIG. 5), the second elastomeric member 104 forms a seal between the seal surface 112 of the flange 109 and the seal surface 330 of the union 100 to form a second fitting seal. In one aspect the first fitting seal (e.g. formed by elastomeric member 103) may be configured to substantially prevent fluids from escaping (e.g. hold a system pressure or partial system pressure of the fluidic system in which the tube fitting is installed) the assembled or otherwise coupled tube fitting 105. The second fitting seal (e.g. formed by elastomeric member 104) may be configured to substantially prevent ingress of particles and/or fluids into the internal passage(s) of the assembled tube fitting 105. In other aspects the second fitting seal may also be configured to substantially prevent fluids from escaping (e.g. hold a system pressure or partial system pressure of the fluidic system in which the tube fitting is installed) the assembled or otherwise coupled tube fitting 105 in event fluid passes by the first fitting seal.

The nut 101 includes a generally cylindrical body 101B having an internal passage 311 extending along a longitudinal axis or centerline LX3 of the body 101B. In this aspect the internal passage 311 is sized and configured to allow tubing 201 to be inserted into the internal passage 311 while allowing the nut 101 to slide along tubing 201 (e.g. the internal passage has an inner diameter greater than an outer diameter of the tubing). The internal passage 311 may also be configured to allow the sleeve 102 to be at least partially inserted into the internal passage 311, or in other words to allow the nut 101 to slide over at least a portion of the sleeve 102 so that the sleeve 102 is located at least partially within the internal passage 311. As can be seen best in FIG. 6, the internal passage 311 includes a step or shoulder 600 configured to engage the engagement surface 500 of the sleeve 102 when the sleeve 102 is located at least partially within the internal cavity 311. Engagement between the shoulder 600 and the engagement surface 500 of the sleeve may provide compressive force to one or more of the elastomeric seal members 103, 104 when the tube fitting 105 is assembled or when the tube fitting 105 is being assembled. As may be realized, when assembling the sleeve 102 and nut 101 onto tubing 201 the tubing 201 may be inserted through the internal passage 311 of the nut 101 and the sleeve 102 may be affixed to the tubing 201 to prevent removal of the nut 101 from the tubing and so that the flange 109 is disposed between the shoulder 600 of the nut 101 and the seal surface 330 of the union 100 when the tube fitting 105 is assembled.

The nut 101 may also include a textured surface 108 and one or more flats 107 axially arranged or spaced along the longitudinal axis of the body 101B. The textured surface 108 may be located at a first end of the body 101B and include any suitable texture for allowing tool-less manual manipulation of the nut 101 (e.g. manipulation substantially without tools). For example, the textured surface 108 may be a knurled surface that provides a predetermined amount of grip so that an operator (e.g. mechanic) can grasp the nut 101 and engage the nut 101 with the union 100 as will be described below. The one or more flats 107 may be substantially similar to the one or more flats 113 of the union so that any suitable tool, such as a wrench, can engage the one or more flats 107 for providing relative rotation between, for example, the nut 101 and the union 100. In one aspect the nut 101 includes a plurality of tines 106 extending from the body 101B on an opposite side of the one or more flats 107 than the textured surface 108. Each tine 106 may be integrally formed as a unitary one piece member with the body 101B and extend away from the body 101B so as to be cantilevered from the body 101B. Here the tine may be considered as having a proximate end (e.g. closest to the body) and a distal end (e.g. furthest from the body). Each tine 106 may include an inwardly facing (e.g. generally facing towards the centerline line of the body 101B) shoulder adjacent the distal end having a first angled surface or engagement ramp 400 and an opposing second angled surface or disengagement ramp 401 that may be substantially similar to disengagement ramp 115S1 and engagement ramp 115S2 described above. For example, the engagement ramp 400 may have an angle (e.g. relative to the longitudinal axes or centerline LX3) that is substantially similar to angle β and the disengagement ramp 401 may have an angle (e.g. relative to the longitudinal axes or centerline LX3) substantially similar to angle α. In one aspect the engagement ramps 400, 115S2 may have the same or different angles. In still other aspects the disengagement ramps 401, 115S1 may have the same or different angles. As will be described below, the engagement ramp 400 may be configured to engage the engagement ramp 115S2 for allowing assembly of the tube fitting 105 and disengagement ramp 401 may be configured to engage the disengagement ramp 115S1 to provide a retention force (e.g. against axial loads applied to the assembled tube fitting 105) that allows the assembled tube fitting 105 to withstand fluidic system pressures, burst and blow off loads and while providing the ability to disassemble the tube fitting 105 upon application of a predetermined torque to the nut 101 relative to the union 100 or vice versa. In another aspect at least a portion of the internal passage 311 of the nut 101 may include fastening members or features 105F (FIG. 6) configured to engage the fastening members 105M of the union 100. Engagement of the fastening members 105F, 105M may provide one or more of a mechanical advantage for assembling the tube fitting 105 and a retention force or resistance to axially loads applied to the assembled tube fitting 105.

Figure 3:
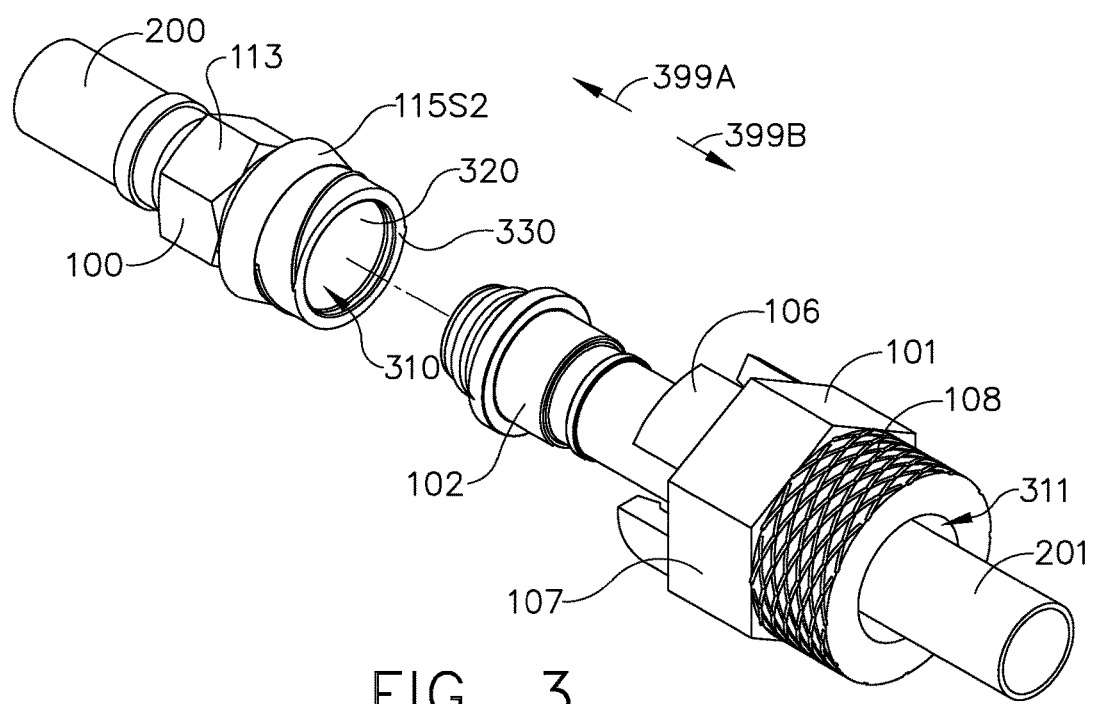
FIG. 3 is a schematic illustration of the tube fitting of FIG. 1 in accordance with aspects of the disclosed embodiment.
Figure 4:
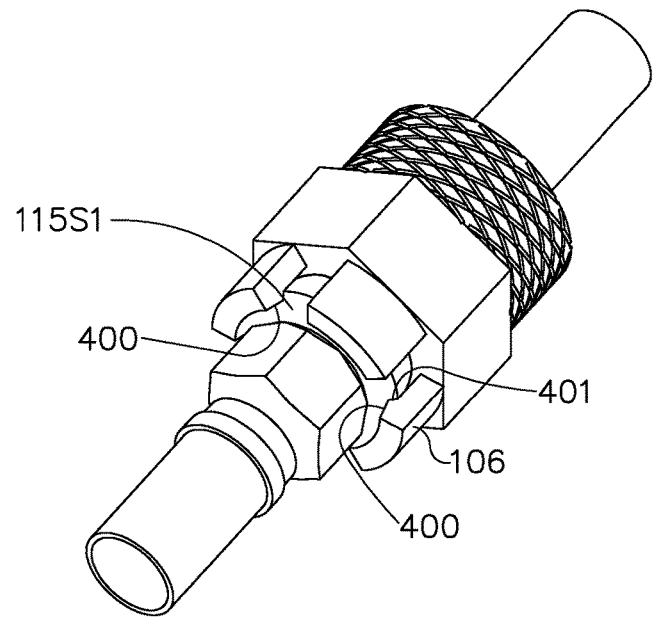
FIG. 4 is a schematic illustration of the tube fitting of FIG. 1 in accordance with aspects of the disclosed embodiment.
Figure 8:
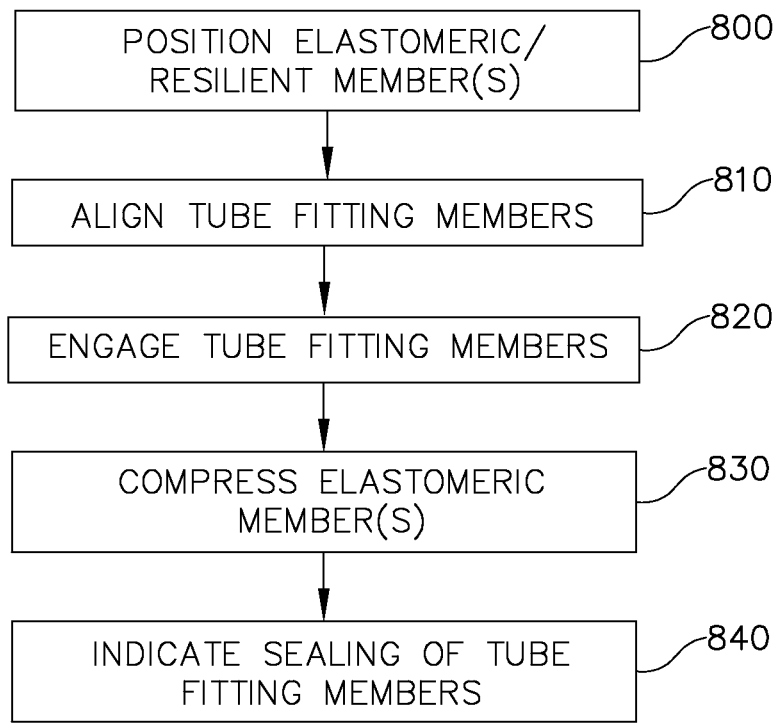
FIG. 8 is a flow diagram in accordance with aspects of the disclosed embodiment.

Referring now to FIGS. 3 and 6 an exemplary assembly of the tube fitting 105 will be described in accordance with an aspect of the disclosed embodiment. In one aspect the union 100 may be affixed to a first side tubing piece 200, the nut 101 may be placed over a second side tubing piece 201 and the sleeve 102 may be affixed to the second side tubing piece 201. Elastomeric member 104 may be positioned adjacent or within a groove of the flange sealing surface 112 and elastomeric member 103 may be positioned on a surface of the seal portion 111 of the sleeve 102 (FIG. 8, Block 800). The longitudinal axis or centerline LX2 (FIG. 1) of the sleeve 102 may be generally aligned with the longitudinal axis or centerline LX (FIG. 1) of the union 100. The longitudinal axis LX3 of the nut 101 may also be substantially aligned with the longitudinal axes LX, LX2 (FIG. 8, Block 810). As may be realized, when the tube fitting members 100, 101, 102 are assembled their axes LX, LX2, LX3 are substantially in-line with a centerline CL of the tube fitting.

The tube fitting members may be engaged for assembly in any suitable manner (FIG. 8, Block 820). For example, the nut 101 may be positioned (e.g. using the textured surface 108 or any other portion of the nut) at least partially over the sleeve 102 so that the sleeve is located at least partially within the internal passage 311 of the nut 101. The nut 101 may be moved in an installation direction 399A towards the union 100 so that the shoulder 600 of the nut presses against the engagement surface 500 of the sleeve 102 causing the seal portion 111 of the sleeve to move towards the surface 320 of the union 100 effecting at least a partial compression of the elastomeric member 103. Moving the nut 101 in the installation direction 399A also causes the flange sealing surface 112 of the sleeve 102 to move towards the seal surface 330 of the union 100 effecting at least a partial compression of the elastomeric member 104. The nut 101 may be moved in the installation direction 399A towards the union 100 so that the tines 106 engage the shoulder 115 and to further compress the elastomeric members 103, 104 (FIG. 8, Block 830). In one aspect the nut 101 may be rotated substantially without tools by, for example, applying force to one or more of the textured surface 108 or the one or more flats 107 so that fastening members 105F of the nut 101 engage fastening members 105M of the union 100 and a mechanical advantage (e.g. such as obtained by the threaded engagement of the fastening members 105M, 105F) is leveraged for moving the nut 101 in the assembly direction 399A. In other aspects, the fastening members 105M, 105F may not be provided and the nut 101 may be pressed in the assembly direction 399A for further compressing the elastomeric members and so that the tines 106 engage the shoulder 115.

As described above, each of the tines 106 includes an engagement ramp or surface 400 that engages and slides over the engagement ramp 115S2 of the shoulder 115. As may be realized, the cantilevered tines 106 may form resilient members that provide a respective radially inward force (e.g. in the direction of arrows 699A, 699B) that resists movement (e.g. in the axial or installation direction) between the nut 101 and the union 100 when the nut is moved in the installation direction 399A. As may be also be realized the tines 106 may flex radially outward, e.g. to provide the resistive force, as the engagement ramp 400 of the tine 106 slides over the engagement ramp 115S2 of the shoulder 115. The angle β of the engagement ramps 400, 115S2 may be provided so that the resistive force provided by the tines 106 is overcome by a predetermined amount of torsional and/or axial engagement force applied (e.g. substantially without tools) to the nut 101 relative to the union 100.

The interaction between the tines 106 and the shoulder may also provide a positive latching system that determines or otherwise provides an indication of when a proper seal is made such as by the compression of the elastomeric members 103, 104 through the interaction of the union 100, the nut 101 and the sleeve 102 (FIG. 8, Block 840). For example, the engagement of the tines 106 with the shoulder 115 may provide one or more of a tactile, aural and visual indication of when the tube fitting is fully assembled and the proper seal is made. In one aspect as the engagement ramp 400 slides along the engagement ramp 115S2, the crest CR2 between the engagement ramp 400 and the disengagement ramp 401 may pass over the crest the CR1 of the shoulder 115 producing an aural sound (e.g. such as a snap) indicating that the nut 101 has been moved a predetermined amount in the installation direction 399A relative to the union 100 to effect sealing of the tube fitting 105. In another aspect the passing of the crest CR2 over the crest CR1 may provide a mechanical vibration in the fitting that can be felt by, for example, a mechanic touching or otherwise holding the fitting members 100, 101, 102. In still another aspect, the tines 106 and shoulder 115 may provide a visual indication of when the nut 101 has been moved a predetermined amount in the installation direction 399A relative to the union 100 to effect sealing of the tube fitting 105. For example, the visual indication may be provided when the disengagement ramp 401 of the tines 106 is visually substantially seated against the disengagement ramp 115S1 of the shoulder 115.

Figure 7:
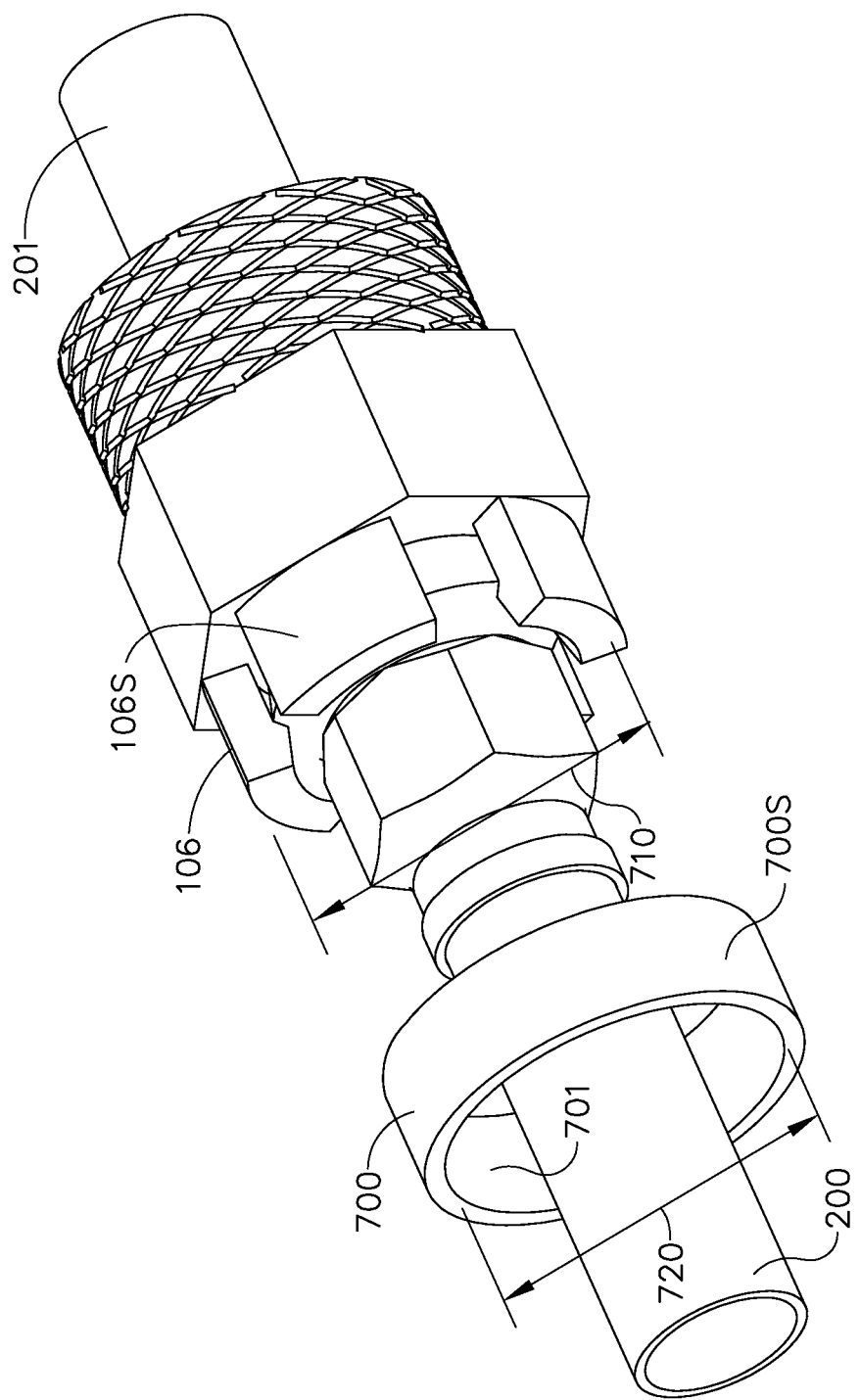
FIG. 7 is a schematic illustration of the tube fitting of FIG. 1 in accordance with aspects of the disclosed embodiment.

In one aspect, referring to FIG. 7 a retainer ring 700 may also be provided. The retainer ring 700 may include an outer surface 700S and an inner surface 701. In this aspect, the retainer ring 700 may include an inner diameter 720 and the tines 106 may include outer surfaces 106S having a diameter 710. The inner diameter 720 of the retainer ring 700 may be larger than the diameter 710 so that the retainer ring fits over the tines. In one aspect any suitable fastener(s) may be provided for holding the retainer ring 700 on the tines 106. For example, there may be a friction fit between the inner surface 701 of the retainer ring 700 and the outer surface 106S of the tines 106 for holding the retaining ring on the tines. In other aspects, the inner surface 701 of the retainer ring may include fastening members substantially similar to fastening members 105F and the outer surface 106S of the tines 106 may include fastening member substantially similar to fastening members 105M so that the retainer ring 700 may be threaded onto the tines 106. Any suitable retaining wire, pins, or snaps may be provided to substantially prevent the un-threading or backing off of the retaining ring 700 from the tines 106. As may be realized, the retaining ring 700 may substantially prevent the spreading of the tines further locking the disengagement ramp 401 of each tine 106 against the disengagement ramp 115S1 of the shoulder 115 (FIG. 6).

Disassembly of the tube fitting 105 may occur in a manner substantially opposite to that described above. However, the axial force needed to disengage the nut 101 from the union 100 may be substantially greater than the axial force needed to engage the nut 101 with the union 100. For example, as described above, the angle α of the disengagement ramps 401, 115S1 may be greater than the angle β so that the resistive force provided by the tines 106 in the axial direction is harder to overcome during disengagement than it is during engagement. In one aspect the angle α may be provided such that a predetermined torsional and/or axial disengagement force is applied to the nut 101 for moving the nut 101 in a disassembly direction 399B relative to the union 100 effecting a radial spreading of the distal ends of the tines 106 as the disengagement ramp 401 of each tine 106 slides against the disengagement ramp 115S1 of the shoulder 115. As may be realized, the predetermined torsional and/or axial disengagement force may be provided through the use of simple tools, such as with a wrench, applied to the one or more flats 113, 107. In other aspects the angle α may be such that movement of the nut 101 relative to the union 100 in the disengagement direction 399B may be provided substantially without tools. As may be realized, where the retainer ring 700 is provided the retainer ring is removed from the tines prior to disassembly of the tube fitting 105.

As can be seen from the above description, the tube fitting 105 in accordance with the aspects of the disclosed embodiment provides a metal on elastomeric material seal, a tube fitting that can be assembled by hand, a tube fitting that provides multiple sealing points and/or a tube fitting that includes a positive latching system that determines when a proper seal is made and substantially prevents the nut from disengaging the union 100. The configuration of the tube fitting 105 as described above allows for assembly of the tube fitting 105 so that the sealing of the tube fitting may be performed in less than about 10 seconds. In other aspects the sealing of the tube fitting may be performed in more or less than about 10 seconds. The torque and/or axial force for assembling the tube fitting 105 is low allowing for a tool-less installation of the tube fitting 105 while substantially eliminating a need to look up predetermined fitting torque values and preventing over tightening of the tube fitting. The elastomeric sealing members 103, 104 may compensate for fluctuation in the sealing surfaces of the union 100 and sleeve 102. The sealing surfaces of the tube fitting 105 can also be repaired by replacing one or more of the elastomeric members 103, 104.

Figure 9:
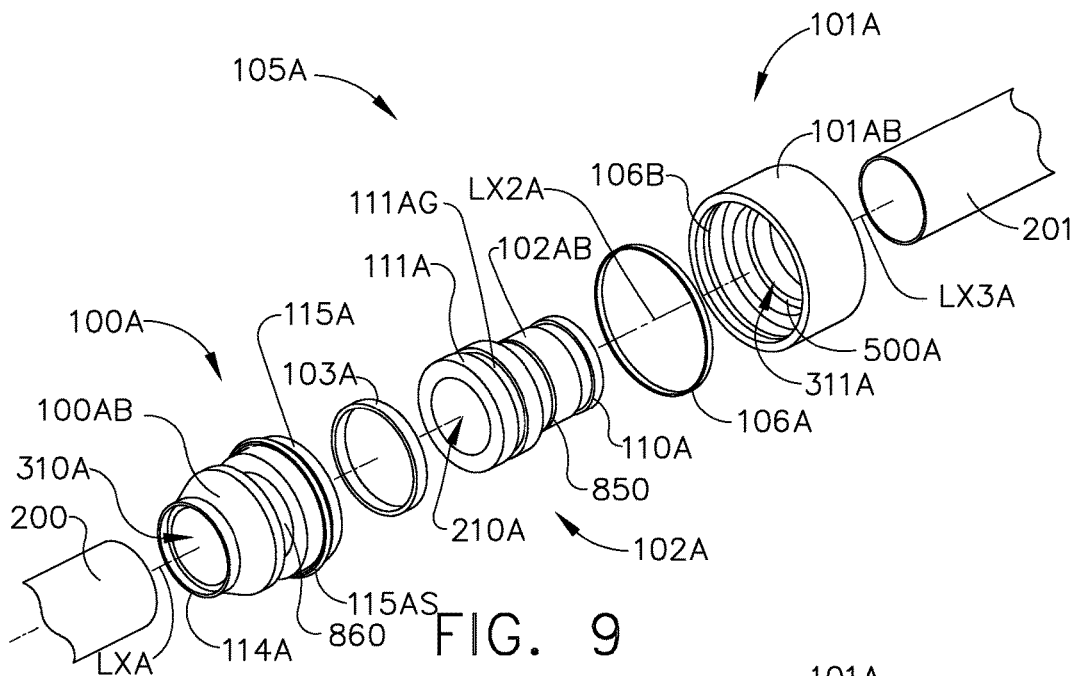
FIG. 9 is another schematic illustration of a tube fitting in accordance with aspects of the disclose embodiment.

Referring now to FIG. 9, a schematic illustration of a tube fitting 105A in accordance with an aspect of the disclosed embodiment. In one aspect the tube fitting 105A is a torque-less reconnectable quick-connect or easy-snap fitting for joining or coupling two tubes. The tube fitting 105A may allow for reduced installation times, such as when compared to threaded compression fittings or other conventional fittings, while providing a re-connectable fitting that can be installed in, for example, any suitable aircraft 1102 (FIG. 21) or other vehicle that includes tube connectors for hydraulic, pneumatic or other suitable fluidic systems. The tube fitting 105A may also allow decreased difficulty in installation, such as the elimination of requiring rotation tools to assemble due to the fact that there are no thread portions. This will create less difficult installations in hard to reach areas. Also installation will be less difficult by eliminating any need for torque values to determine an amount of force required to assemble the tube fitting 105A as the tube fitting 105A lacks a threaded portion. In one aspect the tube fitting 105A is provided for installation on existing tubing where one or more of the tube fitting members 100A, 101A, 102A is coupled to or otherwise installed on the existing tubing in any suitable manner, such as by crimping, swaging, soldering, welding, etc. In other aspects the tube fitting 105A is preinstalled on tubing where the tubing/fitting assembly is installed as a unit within, for example, the aircraft 1102. The tube fitting 105A is coupled to or otherwise installed on two separate rigid tubes, one rigid tube and one flexible tube, such as a hose, and/or two separate flexible tubes (e.g. such as two flexible hoses that are joined by the tube fitting) as at least one tube fitting member 101A of the tube fitting 105A is free to move along the tube (rigid or flexible), independent of movement of the tube, to which it is attached. As will also be described in greater detail below the tube fitting 105A may include one or more elastomeric seals.

Figure 10:
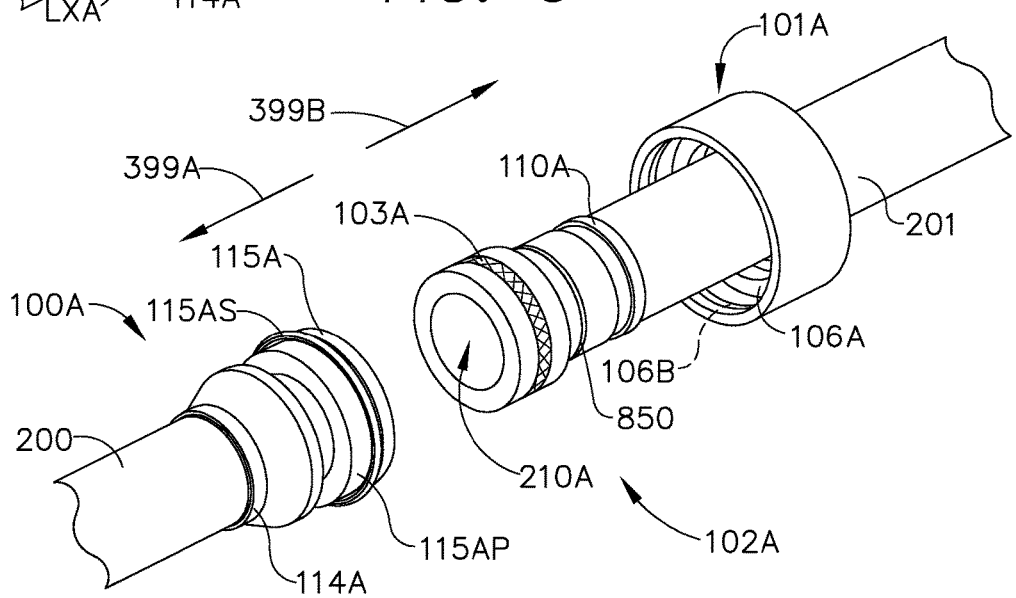
FIG. 10 is a schematic illustration of the tube fitting of FIG. 9 in accordance with aspects of the disclosed embodiment.
Figure 11:
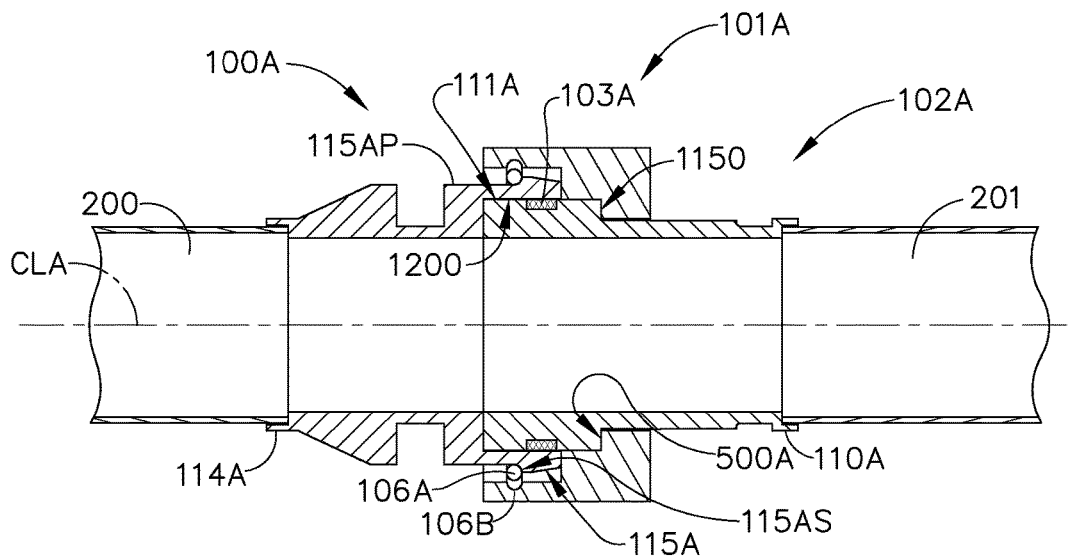
FIG. 11 is a schematic sectional view of the tube fitting of FIG. 9 in accordance with aspects of the disclosed embodiment.

Referring also to FIGS. 10-11 in one aspect the tube fitting 105A includes a first side fitting member or union 100A, a second side fitting member or sleeve 102A and a coupling member or nut 101A. The union 100A, sleeve 102A and nut 101A are constructed of any suitable metal, plastic, composite or any other suitable material.

The union 100A includes a generally cylindrical body 100AB having an internal passage 310A extending along a longitudinal axis or centerline LXA of the body 100AB. The union 100A may also include a tubing engagement portion 114A, an engagement surface 115A, a shoulder portion 115AS an inner circumferential sealing surface 1200 (see FIG. 11) and a circumferential slot or groove 860 axially arranged or spaced along the body 100AB. The internal passage 310A may extend through the body 100AB for allowing fluid to pass through the union 100A. The tubing engagement portion 114A is disposed at a first end of the union 100A and configured for coupling the union 100A to any suitable tubing 200 as noted above. In one aspect the tubing engagement portion 114A is configured such that the tubing 200 is inserted at least partially into the internal passage 310A and the tubing engagement portion 114A is secured to the tubing in any suitable manner substantially similar to that described above. In other aspects the tubing 200 is secured to the union 100A in any suitable manner. As described previously, the tubing 200 can be rigid or flexible tubing. The engagement surface 115A includes a groove, slot and/or recessed surface that includes a shoulder portion 115AS configured to receive a retaining ring or member 106A, as will be described below, for coupling the nut 101A to the union 100A. When engagement surface 115A receives the retaining ring 106A, the retaining ring 106A will engage the shoulder portion 115AS of the engagement surface 115A effecting a longitudinal retention force that will prevent the union 100A and the nut 101A from decoupling. The inner circumferential sealing surface 1200 is disposed at a second end opposite the first end of the union 100A. The inner circumferential sealing surface 1200 is configured for interfacing with one or more elastomeric seals, such as elastomeric seal 103A, to prevent fluid from escaping the tube fitting 105A when tube fitting 105A is assembled as will be described in further detail below. Although a single seal 103A is illustrated and described, in other aspects any suitable number of seals (more than one) are provided for interfacing with inner circumferential sealing surface 1200. The circumferential slot 860 is located on and circumscribes the body 100AB of the union 100A and is configured to receive one or more tools for decoupling the tube fitting 105A from an assembled configuration. The decoupling tools, as will be further described below, are inserted into the circumferential slot 860 and moved at least in part in the disassembly direction 399B (FIG. 10). The movement in the disassembly direction 399B will cause a decoupling of the tube fitting 105A as will be further described below.

In one aspect the sleeve 102A includes a generally cylindrical body 102AB having an internal passage 210A extending along a longitudinal axis or centerline LX2A of the body 102AB. The sleeve 102A may also include a tubing engagement portion 110A, an indicator line 850, a groove 111AG and an outer circumferential sealing surface 111A axially arranged or spaced along the body 102AB. The internal passage 210A may extend through the body 102AB for allowing fluid to pass through the sleeve 102A. The tubing engagement portion 110A is located at a first end of the sleeve 102A and is substantially similar to tubing engagement portion 114A of the union 100A for securing the sleeve 102A to any suitable tubing 201 in any suitable manner such as described above. The outer circumferential sealing surface 111A includes a slot or groove 111AG disposed at a second end of the sleeve 102A opposite the first end of the sleeve 102A that is configured to receive, for example, elastomeric seal 103A. As can be seen in FIG. 10, elastomeric seal 103A, having any suitable shape and/or configuration, is placed around or otherwise affixed to or at least partially within the outer circumferential sealing surface 111A such as within the groove 111AG. As may be realized, the elastomeric seal 103A may radially extend beyond an outer surface of the body 102AB by a predetermined amount such that when the outer circumferential sealing surface 111A is inserted into the union 100A the elastomeric seal 103A is compressed and engages both inner circumferential sealing surface 1200 and at least a portion of the body 102AB corresponding to the outer circumferential sealing surface 111A to effect a fitting seal between the union 100A and sleeve 102A. In one aspect the fitting seal (e.g. formed by elastomeric seal 103A) is configured to substantially prevent fluids from escaping (e.g. hold a system pressure or partial system pressure of the fluidic system in which the tube fitting 105A is installed) the assembled or otherwise coupled tube fitting 105A. The fitting seal is also configured to substantially prevent ingress of particles and/or fluids into the internal passage(s) of the assembled tube fitting 105A. While the figures only show one elastomeric seal, as noted above, the tube fitting 105A may have more than one elastomeric seal disposed upon the outer circumferential sealing surface 111A and/or on the inner circumferential sealing surface 1200 (such as in a manner similar to that described above with respect to elastomeric seal 103A) to effect a seal that may increase the effectiveness of preventing escape or ingress of particles from the tube fitting 105A. The indicator line 850 is disposed on the sleeve 102A at a portion that corresponds with a position of the nut 101A relative to the sleeve 102A when the nut 101A is coupled to the union 100A (e.g. when the tube fitting 105A is assembled). The indicator line 850 is formed in any suitable manner, such as by, for example, etching, machining, painting and/or otherwise marking the indicator line 850 into/on the surface of the cylindrical body 102AB. The indicator line 850 is a visual indication to allow, for example, a mechanic to visually detect when the retaining ring 106A has engaged the engagement surface 115A coupling the tube fitting members 100A, 101A, and 102A.

The nut 101A includes a generally cylindrical body 101AB having an internal passage 311A extending along a longitudinal axis or centerline LX3A of the body 101AB. In this aspect the internal passage 311A is sized and configured to allow tubing 201 to be inserted into the internal passage 311A while allowing the nut 101A to slide along a length of tubing 201 (e.g. the internal passage has an inner diameter greater than an outer diameter of the tubing). The internal passage 311A may also be configured to allow the sleeve 102A to be at least partially inserted into the internal passage 311A, or in other words to allow the nut 101A to slide over at least a portion of the sleeve 102A so that the sleeve 102A is located at least partially within the internal passage 311A. As can be seen best in FIGS. 9 and 11, the internal passage 311A includes a step or shoulder 500A configured to engage the engagement surface or shoulder 1150 of the sleeve 102A when the sleeve 102A is located at least partially within the internal passage 311A. Engagement between the shoulder 500A and the engagement surface 1150 of the sleeve 102A may provide retention force to keep the sleeve at least partially inserted within the union 100A when the tube fitting 105A is assembled or when the tube fitting 105A is being assembled as will be further described below. As may be realized, when assembling the sleeve 102A and nut 101A onto tubing 201, the tubing 201 is inserted through the internal passage 311A of the nut 101A and the sleeve 102A is affixed to the tubing 201 to prevent removal of the nut 101A from the tubing (e.g. the nut 101A is unable to pass completely over the sleeve 102A).

In one aspect, the nut 101A also includes a retaining ring 106A. The retaining ring 106A is formed by any suitable resilient material that will allow for expansion and contraction and has a tensile/shear strength great enough to withstand fluidic system pressures, burst and blow off loads. The retaining ring 106A is disposed within a retaining ring groove 106B located within the internal passage 311A of the nut 101A. The retaining ring 106A is configured to radially expand within groove 106B so that the nut 101A is able to slide over the second end of the union 100A and subsequently radially contract to engage the shoulder portion 115AS of the engagement surface 115A of the union 100A effecting a coupling between the union 100A and the nut 101A that allows the assembled tube fitting 105A to withstand fluidic system pressures, burst and blow off loads. As may be realized, the shoulder portion 115AS of engagement surface 115A faces a direction opposite the engagement surface 1150 of the sleeve 102A so as to retain the retaining ring 106A and nut 101A from moving in direction 399B. The ability of the retaining ring 106A to expand and contract also provides the tube fitting 105A the ability to be disassembled upon application of a decoupling tool as will be described below. In one aspect the retaining ring 106A is a substantially continuous metal ring or band. In another aspect, the retaining ring 106A is a split ring that opens (expands) and closes (contracts) within the grove 106B allowing the nut 101A to slide over the union 100A, In other aspects, the retaining ring is, at least partially, an elastic member that allows radial expansion and contraction to allow the nut 101A to slide over the union 100A and engage the shoulder portion 115AS of the engagement surface 115A. As one non-limiting example of a partially elastic retaining, the retaining ring is a detent type ring that includes an elastic member and a plurality of ball bearings arranged in a ring where the elastic member biases the plurality of ball bearing radially inwards towards a center of the ring so as to engage the shoulder portion 115AS in the manner described herein. In other aspects the retaining ring 106A has any suitable configuration.

Figure 12:
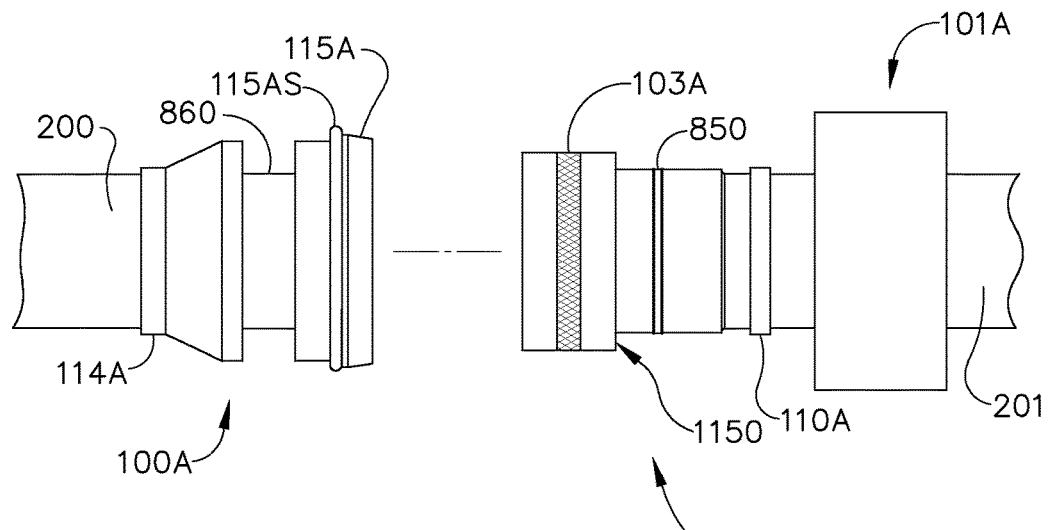
FIG. 12 is a schematic illustration of the tube fitting of FIG. 9 in accordance with aspects of the disclosed embodiment.

Referring also to FIGS. 12-13 an exemplary assembly of the tube fitting 105A will be described in accordance with an aspect of the disclosed embodiment. In one aspect of the tube fitting 105A, any suitable compression tool is employed to install the tube fitting 105A while in other aspects the tube fitting may not need tools to install or otherwise connect the tube fitting members 100A, 101A, 102A. In one aspect decoupling tools are employed to disconnect or otherwise uninstall the tube fitting members 100A, 101A, 102A. In one aspect the union 100A is affixed (as noted above) to a first side tubing piece 200, the nut 101A is placed over a second side tubing piece 201 and the sleeve 102A is affixed (as noted above) to the second side tubing piece 201. Elastomeric member 103A is positioned within a groove 111AG of the outer circumferential sealing surface 111A of the sleeve 102A (FIG. 8, Block 800). The longitudinal axis or centerline LX2A (FIG. 9) of the sleeve 102A is generally aligned with the longitudinal axis or centerline LXA (FIG. 9) of the union 100A. The longitudinal axis LX3A of the nut 101A may also be substantially aligned with the longitudinal axes LXA, LX2A (FIG. 8, Block 810). As may be realized, when the tube fitting members 100A, 101A, 102A are assembled their axes LXA, LX2A, LX3A are substantially in-line with a centerline CLA of the tube fitting 105A (see FIG. 11).

The tube fitting members are engaged for assembly in any suitable manner (FIG. 8, Block 820). For example, the nut 101A is positioned at least partially over the sleeve 102A so that the sleeve is located at least partially within the internal passage 311A of the nut 101A. The nut 101A is moved in an installation direction 399A towards the union 100A so that the shoulder 500A of the nut 101A presses against the engagement surface or shoulder 1150 of the sleeve 102A so that the sleeve 102A is captured between the union 100A and the nut 101A effecting at least a partial insertion of the sleeve 102A into the union 100A. The nut 101A is further moved in the installation direction 399A towards the union 100A so that the retaining ring 106A engages the shoulder portion 115AS of the engagement surface 115A to effect the coupling of the nut 101A and the union 100A and hence a coupling of the tube fitting 105A (FIG. 8, Block 820).

The interaction between the retaining ring 106A and the engagement surface 115A may also provide a positive latching system that determines or otherwise provides an indication of when a proper seal is made, such as by the compression of the elastomeric member(s) 103A between outer circumferential sealing surface 111A and inner circumferential sealing surface 1200 through the interaction of the union 100A, the nut 101A and the sleeve 102A (FIG. 8, Block 830). For example, the engagement of the retaining ring 106A with the engagement surface 115A may provide one or more of a tactile or aural indication of when the tube fitting 105A is fully assembled and the proper seal is made (FIG. 8, Block 840). In one aspect as the retaining ring 106A slides over the engagement surface 115A and over the shoulder portion 115AS an aural sound is produced (e.g. such as a snap) indicating that the nut 101A has been moved a predetermined amount in the installation direction 399A relative to the union 100A to effect sealing of the tube fitting 105A. In another aspect the passing of the retaining ring 106A over the engagement surface 115A and over the shoulder portion 115AS may provide a mechanical vibration in the fitting that can be felt by, for example, a mechanic touching or otherwise holding the fitting members 100A, 101A, 102A. In still another aspect, an indicator line 850, located, for example, on the sleeve 102A, may provide visual indication of when the nut 101A has been moved a predetermined amount in the installation direction 399A relative to the union 100A to effect sealing of the tube fitting 105A. For example, as the nut 101A is moved in installation direction 399A, the sleeve is partially inserted into a first end of the nut 101A. As the nut continues to slide over the sleeve and engage the second end of the union 100A, the sleeve 102A subsequently begins to exit a second end of the nut 101A. When the retaining ring 106A engages the engagement surface 115A, the indicator line 850 becomes visible on the sleeve 102A as the sleeve 102A exits the second end of the nut 101A.

Disassembly of the tube fitting 105A may occur in a manner substantially opposite to that described above. However, in one aspect, the use of one or more decoupling tools is needed to disengage the nut 101A from the union 100A while in other aspects decoupling tools may not be needed. For example, as described above, the retaining ring 106A of the nut 101A expands and slides over the first end of the union 100A and engages the shoulder portion 115AS of the engagement surface 115A. To disengage the nut 101A from the union 100A, the retaining ring is expanded so as to pass over the shoulder portion 115AS of the engagement surface 115A and slide off the first end of the union 100A. As may be realized, the expansion of the retaining ring is provided through the use of a decoupling tool 1300 and a leverage tool 1310 as seen in FIGS. 14A-14B. To effect decoupling, the union 100A is passed through a decoupling tool opening 1303 of the decoupling tool 1300 (e.g. the decoupling tool 1300 is placed over the union 100A) so that the decoupling tool 1300 is inserted into slot 860 causing the decoupling engagement surface 1302 of the decoupling tool 1300 to substantially engage the cylindrical body 100AB of the union 100A within the slot 860. The decoupling tool 1300 is then moved in the disassembly direction 399B. The decoupling tool 1300 includes an outer ridge or interference member 1301 that longitudinally extends from a body 1306 of the decoupling tool 1300. As the decoupling tool 1300 moves in direction 399B the interference member 1301 slides between the retaining ring 106A and peripheral surface 115AP (e.g. located between the slot 860 and the shoulder portion 115AS) of the union 100A effecting the expansion of the retaining ring 106A (allowing the retaining ring 106A to pass over the shoulder portion 115AS) and the decoupling of the tube fitting 105A. In one aspect, a leverage tool 1310 is employed to effect insertion of the interference member 1301 between the retaining ring 106A and the body 100AB to effect expansion of the retaining ring 106A. The leverage tool 1310 has a grip portion 1304 which can be held by, for example, a mechanic and leverage prongs 1305 which can be inserted into the circumferential slot 860 along with the decoupling tool 1300 to allow the mechanic to apply pressure in the disassembly direction 399B forcing the decoupling tool 1300 between the retaining ring 106A and the body 100AB.

As can be seen from the above description, the tube fitting 105A in accordance with the aspects of the disclosed embodiment provides a metal on elastomeric material seal, a tube fitting 105A that can be assembled by hand, a tube fitting that provides multiple sealing points and/or a tube fitting that includes a positive latching system that determines when a proper seal is made and substantially prevents the nut 101A from disengaging the union 100A. The configuration of the tube fitting 105A as described above allows for assembly of the tube fitting 105A so that the sealing of the tube fitting 105A is performed in less than about 10 seconds. In other aspects the sealing of the tube fitting 105A is performed in more or less than about 10 seconds. Assembling the tube fitting 105A is a simple process requiring only a hand operated compression tool so as to apply sufficient pressure to slide the retaining ring 106A over the first end of the union 100A substantially eliminating a need to look up predetermined fitting torque values and preventing over tightening of the tube fitting 105A. The elastomeric seal 103A may compensate for fluctuation in the sealing surfaces of the union 100A and sleeve 102A. The sealing surfaces of the tube fitting 105A can also be repaired by replacing one or more of the elastomeric member(s) 103A.

Figure 15:
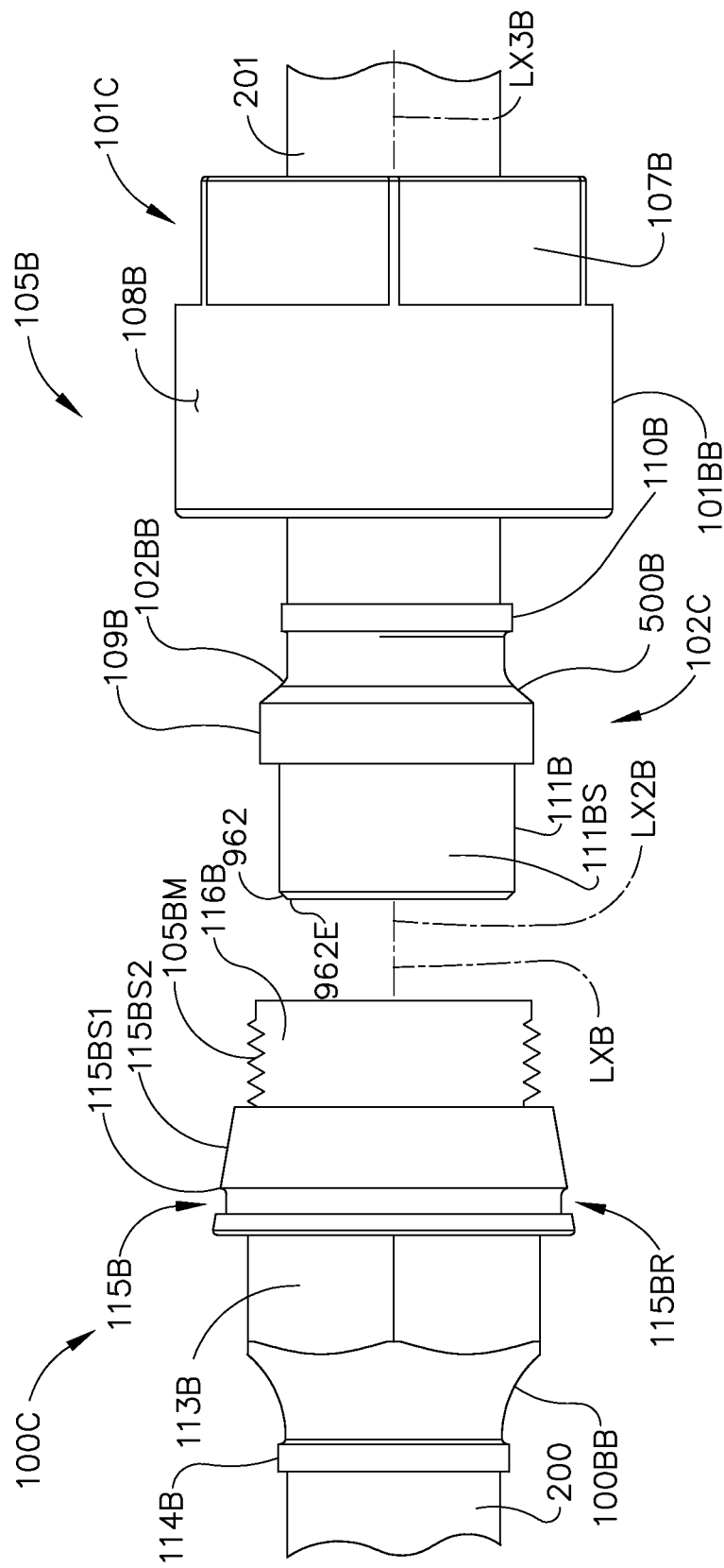
FIG. 15 is a schematic illustration of a tube fitting in accordance with aspects of the disclose embodiment.
Figure 16:
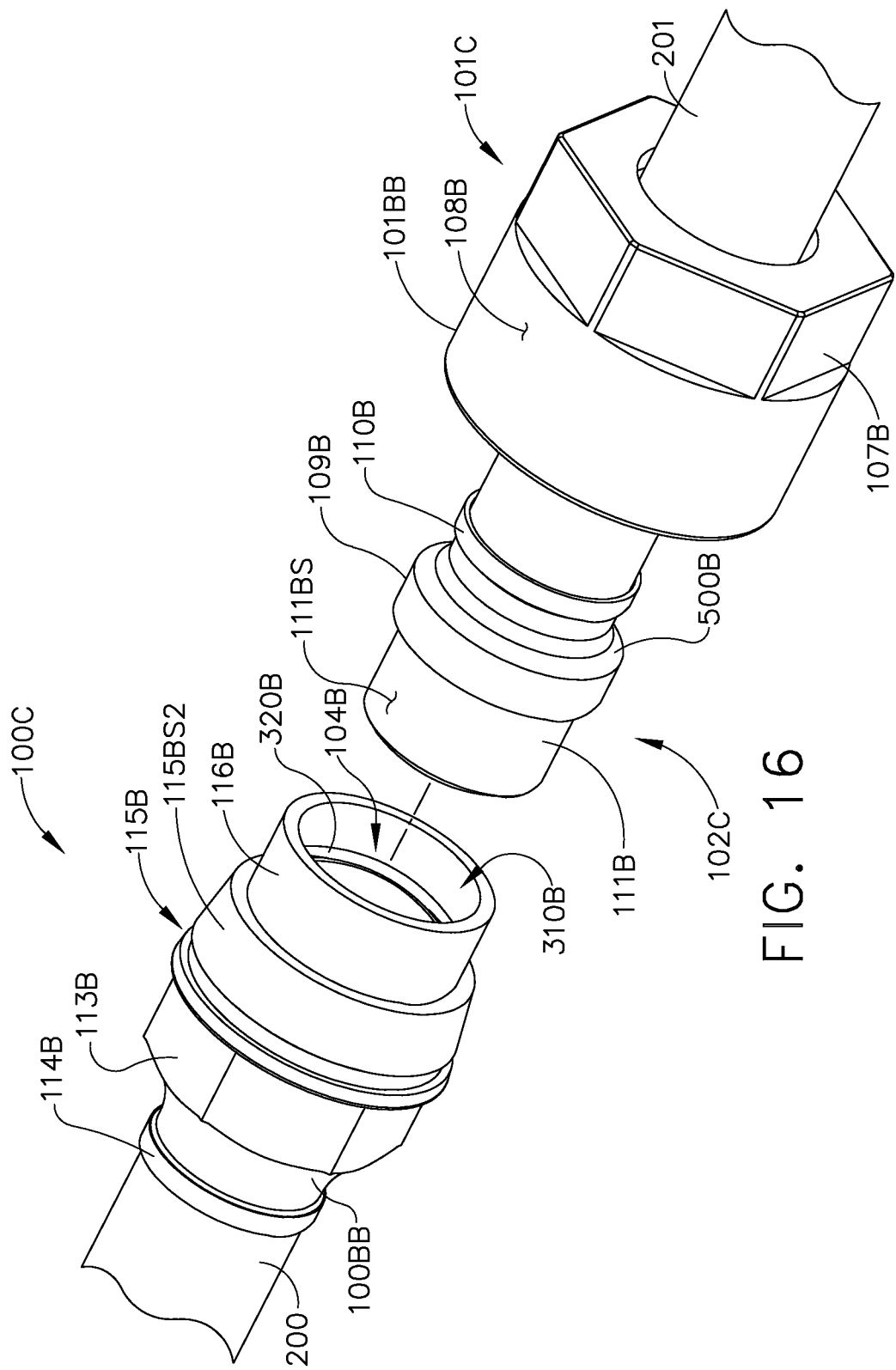
FIG. 16 is a schematic illustration of a tube fitting in accordance with aspects of the disclosed embodiment.
Figure 17:
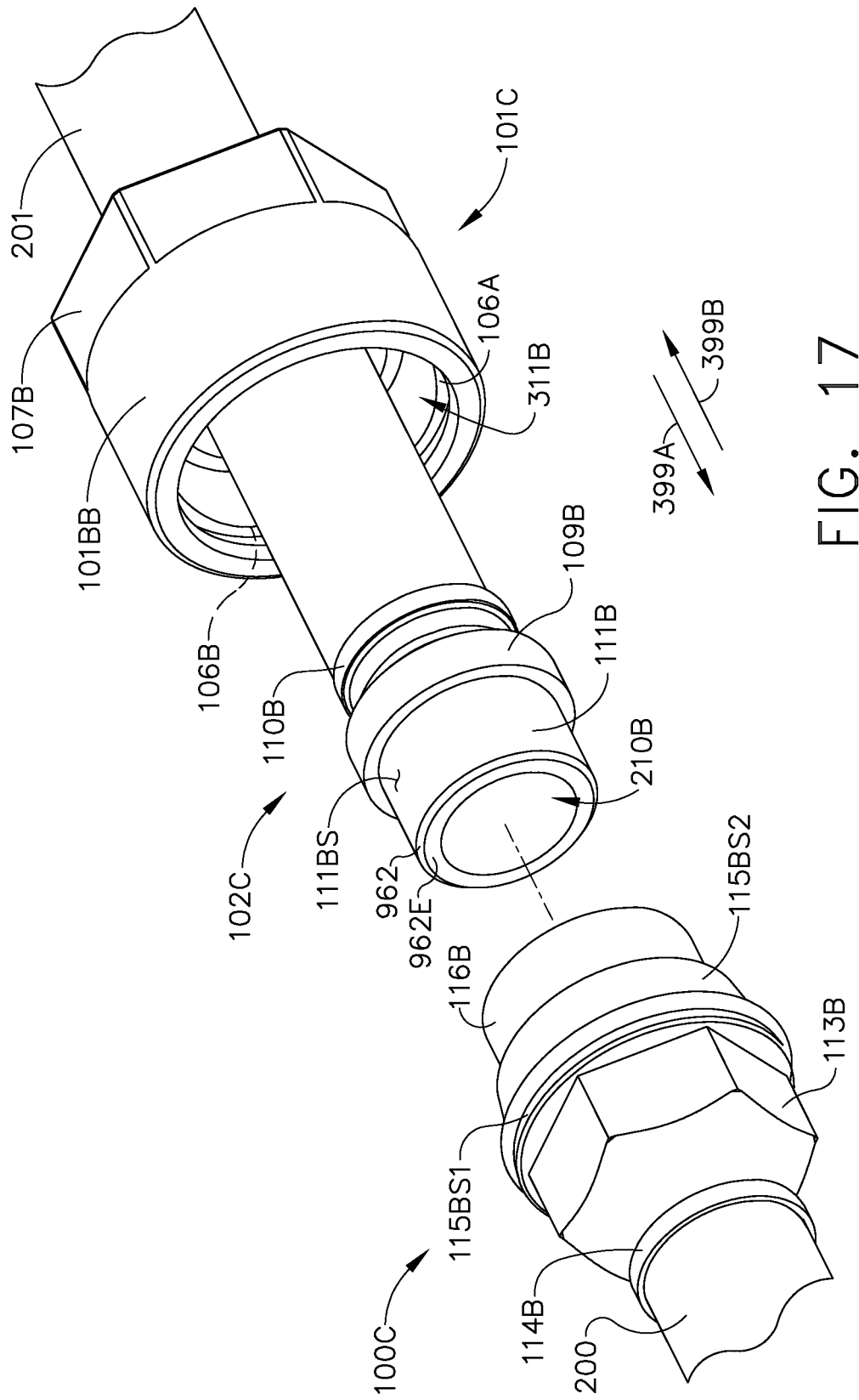
FIG. 17 is a schematic illustration of a tube fitting in accordance with aspects of the disclose embodiment.
Figure 19:
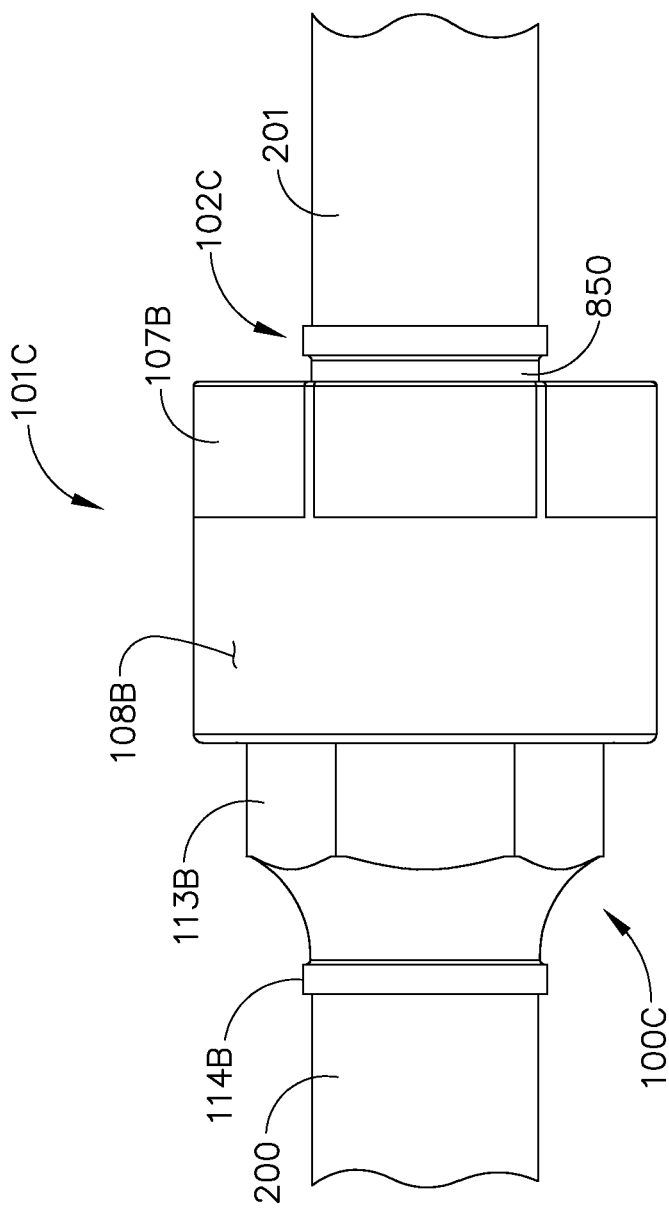
FIG. 19 is a schematic illustration of a tube fitting in accordance with aspects of the disclose embodiment.

Referring now to FIG. 15, a tube fitting 105B is illustrated in accordance with an aspect of the disclosed embodiment. In a manner substantially similar to that described above, in one aspect the tube fitting 105B may be a quick-connect or easy-snap fitting. The tube fitting 105B may not need tools to install or otherwise connect the tube fitting members 100C, 101C, 102C (e.g. provides a tool-less installation as described herein) where standard tools are used to disconnect or otherwise uninstall the tube fitting members. The tube fitting 105B, similar to tube fittings 105, 105A, may allow for reduced installation times, such as when compared to threaded compression fittings or other conventional fittings, while providing a re-connectable fitting that can be installed in, for example, any suitable aircraft 1102 (FIG. 21) or other vehicle that includes tube connectors for hydraulic, pneumatic or other suitable fluidic systems. In one aspect the tube fitting 105B may be provided for installation on existing tubing (including rigid and/or flexible hoses as described above) where one or more of the tube fitting members 100C, 101C, 102C may be coupled to or otherwise installed on any existing tubing (e.g. rigid or flexible) in any suitable manner, such as by crimping, swaging, soldering, welding, etc. In other aspects the tube fitting 105B may be preinstalled on tubing where the tubing/fitting assembly is installed as a unit within, for example, the aircraft 1102. As will also be described in greater detail below the tube fitting 105B may include one or more elastomeric seals and have a configuration that provides for positive low force seals.

Referring still to FIG. 15 and also to FIGS. 16-19 in one aspect the tube fitting 105B includes a first side fitting member or union 100C, a second side fitting member or sleeve 102C and a coupling member or nut 101C. The union 100C, sleeve 102C and nut 101C may be substantially similar to those described above, and may be constructed of any suitable metal, plastic, composite or any other suitable material.

The union 100C includes a generally cylindrical body 100BB having an internal passage 310B having an inner circumferential surface extending along a longitudinal axis or centerline LXB of the body 100BB. The union 100C may also include a tubing engagement portion 114B, one or more flats 113B, a shoulder portion 115B and a seal portion 116B axially arranged or spaced along the body. The internal passage 310B may extend through the body 100BB for allowing fluid to pass through the union 100C. The tubing engagement portion 114B may be disposed at a first end of the union 100C and be configured for coupling the union 100C to any suitable tubing 200. In one aspect the tubing engagement portion may be configured such that the tubing 200 is inserted at least partially into the internal passage 310B and the tubing engagement portion is secured to the tubing in any suitable manner substantially similar to that described above. In other aspects the tubing 200 may be secured to the union 100C in any suitable manner. The one or more flats 113B may be any suitable flats or surfaces substantially similar to flats 113 described above, e.g., configured to allow any suitable tool, such as a wrench, to engage the union for connecting or disconnecting the tube fitting members 100C, 101C, 102C as will be described below. The shoulder portion 115B includes a recess or groove 115BR, a first angled surface or disengagement ramp 115BS1 forming one side wall of the groove 115BR and an opposing second angled surface or engagement ramp 115BS2. As can be seen in FIG. 18, an angle β' of the engagement ramp 115BS2 (e.g. relative to the longitudinal axes or centerline LXB) may be shallower or less than an angle α' of the disengagement ramp 115BS1 (e.g. relative to the longitudinal axes or centerline LXB). The seal portion 116B may disposed at a second end of the union 100C and include one or more fastening members or features 105BM configured to provide mechanical assistance when coupling the tube fitting members 100C, 101C, 102C together. In one aspect the fastening members 105BM may include one or more threads having any suitable pitch. For example, the threads may be quarter-turn or half-turn threads that are configured to start threaded engagement at, for example, about every 72° relative to the circumference of the seal portion 116B (or in other aspects the threads are configured to start threaded engagement at angles that are more or less than about 72°). The threads allow for coupling of the tube fitting member 100C, 101C, 102C with a quarter or half turn of, for example, the nut 101C relative to the union 100C at various circumferentially spaced thread engagement points. In other aspects the threads may have any suitable pitch for coupling the tube fitting members with any suitable relative rotation amount between, for example, the union 100C and the nut 101C. In still other aspects fastening members 105BM may not be provided. As can be seen best in FIGS. 16 and 18, the seal portion 116B includes a first seal surface 320B formed in a wall of the internal passage 310B. The first seal surface 320B may be formed as a recess or groove 320BR into which an elastomeric member 104B, as will be described below, is inserted.

In one aspect the sleeve 102C includes a generally cylindrical body 102BB having an internal passage 210B extending along a longitudinal axis or centerline LX2B of the body 102BB. The sleeve 102C also includes a tubing engagement portion 110B, a flange 109B and a seal portion 111B having an outer circumferential surface axially arranged or spaced along the body 102BB. The internal passage 210B may extend through the body 102BB for allowing fluid to pass through the sleeve 102C. The tubing engagement portion 110B is located at a first end of the sleeve 102C and is substantially similar to tubing engagement portion 114B of the union 100C for securing the sleeve 102C to any suitable tubing 201 in any suitable manner such as described above. The flange 109B may extend radially from a peripheral surface of the tubing engagement portion 110B and include an engagement surface 500B. The seal portion 111B may be disposed at a second end of the sleeve 102C and includes a seal surface 111BS. As can be seen in FIG. 18 the seal portion 111B of the sleeve and the internal surface of the internal passage 310B are substantially parallel with a centerline CLB of the tube fitting 105B (as well as their respective centerlines LXB, LX2B) so as to form a piston type seal (e.g. a peripheral or circumferential seal between two substantially parallel bodies that are movable relative to each other along a common axis). In other aspects the seal portion 111B as well as the internal passage 310B of the union 100C may have any suitable shape and or configuration. In one aspect the sleeve 102C includes a lead surface 962 at the second end of the sleeve 102C. The lead surface 962 has any suitable configuration, such as one or more of a chamfered or rounded surface, to allow the leading edge 962E (relative to the direction 399A of insertion of the sleeve 102C into the union 100C) of the sleeve 102C to pass by the elastomeric member 104B substantially without impingement of the elastomeric member 104B between the leading edge 962E and the groove 320BR.

As can be seen in FIG. 18, the elastomeric member 104B is inserted into the groove 320BR. The elastomeric member 104B has any suitable shape and/or configuration such that the elastomeric member is placed within or otherwise affixed to the seal surface 320B such that when seal portion 111B is inserted into the union 100C the elastomeric member 104B engages both seal surface 320B and the surface 111BS of seal portion 111B to form a fitting seal. In one aspect the fitting seal (e.g. formed by elastomeric member 104B) is configured to substantially prevent fluids from escaping (e.g. hold a system pressure or partial system pressure of the fluidic system in which the tube fitting is installed) the assembled or otherwise coupled tube fitting 105B. The fitting seal (e.g. formed by elastomeric member 104B) may also be configured to substantially prevent ingress of particles and/or fluids into the internal passage(s) of the assembled tube fitting 105B. In one aspect the elastomeric member 104B is a single O-ring seal (e.g. having a durometer that substantially prevents axial deformation of the O-ring seal) that is inserted into the groove 320BR while in other aspects the elastomeric member 104B is a multi-part seal having an O-ring seal 104BM and one or more ancillary O-ring seals 104BA. In one aspect the one or more ancillary O-ring seals 104BA have a durometer that is greater than a durometer of the O-ring seal 104BA so as to support and substantially prevent axial deformation of the O-ring seal 104BM. As such, the one or more ancillary O-ring seals 104BA are disposed on one or more sides (e.g. axially arranged within the groove 320BR) of the O-ring seal 104BM. As can be seen in FIG. 18A, in one aspect the one or more ancillary O-ring seal 104BA is two separate individual seals while in other aspects, the one or more ancillary O-ring seal 104BA is a unitary member having a substantially channel shaped cross section into which channel the O-ring seal 104BM is placed (so that the channel shaped ancillary O-ring seal and the O-ring seal are inserted into the groove 320BR as a unit). As may be realized, while the elastomeric member 104B is described herein as being separate and distinct from the union 100C so as to be inserted (and removed) from the groove 320BR, in other aspects the elastomeric member is molded directly into the groove 320BR.

The nut 101C includes a generally cylindrical body 101BB having an internal passage 311B extending along a longitudinal axis or centerline LX3B of the body 101BB. In this aspect the internal passage 311B is sized and configured to allow tubing 201 to be inserted into the internal passage 311B while allowing the nut 101C to slide along tubing 201 (e.g. the internal passage has an inner diameter greater than an outer diameter of the tubing). The internal passage 311B may also be configured to allow the sleeve 102C to be at least partially inserted into the internal passage 311B, or in other words to allow the nut 101C to slide over at least a portion of the sleeve 102C so that the sleeve 102C is located at least partially within the internal passage 311B. As can be seen best in FIG. 18, the internal passage 311B includes a step or shoulder 600B configured to engage the engagement surface 500B of the sleeve 102C when the sleeve 102C is located at least partially within the internal cavity 311B. As may be realized, engagement between the shoulder 600B and the engagement surface 500B of the sleeve 102C holds the sleeve 102C (and the tube 201 attached thereto) captive so that the elastomeric member 104B maintains contact with the seal surface 111BS of the seal portion 111B of the sleeve 102C when the tube fitting 105B is assembled or when the tube fitting 105B is being assembled. As may be realized, when assembling the sleeve 102C and nut 101C onto tubing 201 the tubing 201 may be inserted through the internal passage 311B of the nut 101C and the sleeve 102C may be affixed to the tubing 201 to prevent removal of the nut 101C from the tubing.

The nut 101C may also include a textured surface 108B and one or more flats 107B axially arranged or spaced along the longitudinal axis of the body 101BB. The textured surface 108B may be located at a first end of the body 101BB and include any suitable texture for allowing toolless manual manipulation of the nut 101C (e.g. manipulation substantially without tools). For example, the textured surface 108B may be a knurled surface that provides a predetermined amount of grip so that an operator (e.g. mechanic) can grasp the nut 101C and engage the nut 101C with the union 100C as will be described below. The one or more flats 107B may be substantially similar to the one or more flats 113B of the union so that any suitable tool, such as a wrench, can engage the one or more flats 107B for providing relative rotation between, for example, the nut 101C and the union 100C.

In one aspect, the nut 101C also includes a retaining ring groove 106B located within the internal passage 311B and a retaining ring 106A. The retaining ring 106A and groove 106B are substantially similar to that described above where the retaining ring 106A is disposed within the retaining ring groove 106B. The retaining ring 106A is configured to radially expand within groove 106B so that the nut 101C is able to slide over the second end of the union 100C and subsequently radially contract to engage the disengagement ramp 115BS1 of the union 100C effecting a coupling between the union 100C and the nut 101C that allows the assembled tube fitting 105B to withstand fluidic system pressures, burst and blow off loads. As may be realized, the angle of the engagement ramp 115BS2 of the union 100C is configured so as to spread or otherwise expand the retaining ring 106A as the nut 101C is moved over the union 100C in the direction 399A (e.g. to assemble the tube fitting 105B). The disengagement ramp 115BS1 faces a direction opposite the engagement ramp 115BS2 so as to retain the retaining ring 106A and nut 101C from moving in direction 399B (e.g. substantially prevents the disassembly of the tube fitting 105B). The ability of the retaining ring 106A to expand and contract also provides the ability to disassemble the tube fitting 105B upon application of a predetermined torque to the nut 101C relative to the union 100C or vice versa. In another aspect at least a portion of the internal passage 311B of the nut 101C includes fastening members or features 105BF (FIG. 18) configured to engage the fastening members 105BM of the union 100C. Engagement of the fastening members 105BF, 105BM may provide one or more of a mechanical advantage for assembling the tube fitting 105B and a retention force or resistance to axially loads applied to the assembled tube fitting 105B.

Referring now to FIGS. 15 and 18 an exemplary assembly of the tube fitting 105B will be described in accordance with an aspect of the disclosed embodiment. In one aspect the union 100C may be affixed to a first side tubing piece 200, the nut 101C may be placed over a second side tubing piece 201 and the sleeve 102C may be affixed to the second side tubing piece 201. Elastomeric member 104B is positioned within the groove 320BR of the union 100C and the retaining ring 106A is positioned within the groove 106B of the nut 101C (FIG. 8, Block 800). The longitudinal axis or centerline LX2B (FIG. 15) of the sleeve 102C is generally aligned with the longitudinal axis or centerline LXB (FIG. 15) of the union 100C. The longitudinal axis LX3B of the nut 101C is also substantially aligned with the longitudinal axes LXB, LX2B (FIG. 8, Block 810). As may be realized, when the tube fitting members 100C, 101C, 102C are assembled their axes LXB, LX2B, LX3B are substantially in-line with a centerline CLB of the tube fitting 105B.

The tube fitting members may be engaged for assembly in any suitable manner (FIG. 8, Block 820). For example, the nut 101C may be positioned (e.g. using the textured surface 108B or any other portion of the nut) at least partially over the sleeve 102C so that the sleeve is located at least partially within the internal passage 311B of the nut 101C. The nut 101C may be moved in the installation direction 399A towards the union 100C so that the shoulder 600B of the nut presses against the engagement surface 500B of the sleeve 102C causing the seal portion 111B of the sleeve to move into the internal passage 310B of the union 100 effecting at least a partial compression of the elastomeric member 104B. The nut 101C may be moved in the installation direction 399A towards the union 100C so that the retaining ring 106A moves along the engagement ramp 115BS2 and is positioned within the groove 115BR so as to engage the disengagement ramp 115BS1 and to further compress the elastomeric member 104B (FIG. 8, Block 830). In one aspect the nut 101C may be rotated substantially without tools by, for example, applying force to one or more of the textured surface 108B or the one or more flats 107B so that fastening members 105BF of the nut 101C engage fastening members 105BM of the union 100C and a mechanical advantage (e.g. such as obtained by the threaded engagement of the fastening members 105BM, 105BF) is leveraged for moving the nut 101C in the assembly direction 399A. In other aspects, the fastening members 105BM, 105BF may not be provided and the nut 101C may be pressed in the assembly direction 399A for further compressing the elastomeric member 104B and so that the retaining ring 106A engages the disengagement ramp 115BS2.

The interaction between the retaining ring 106A and the disengagement ramp 115BS2 provides a positive latching system that determines or otherwise provides an indication of when a proper seal is made such as by the compression of the elastomeric member 104B through the interaction of the union 100C, the nut 101C and the sleeve 102C (FIG. 8, Block 840). For example, the engagement of the retaining ring 106A with the disengagement ramp 115BS2 of the groove 115BR provides one or more of a tactile and aural indication of when the tube fitting is fully assembled and the proper seal is made. In one aspect as the retaining ring 106A slides along the engagement ramp 115BS2, the retaining ring 106A passes over a crest the CRIB of the shoulder portion 115B producing an aural sound (e.g. such as a snap) and/or a mechanical vibration (as noted above) indicating that the nut 101C has been moved a predetermined amount in the installation direction 399A relative to the union 100C to effect sealing of the tube fitting 105B. In still another aspect, the nut 101C and sleeve 102C provides a visual indication as described above with respect to indicator line 850 (see also FIG. 19, where the indicator line is disposed on the sleeve 102C in the manner described above with respect to sleeve 102A).

Disassembly of the tube fitting 105B may occur in a manner substantially opposite to that described above. However, the axial force needed to disengage the nut 101C from the union 100C may be substantially greater than the axial force needed to engage the nut 101C with the union 100C. For example, as described above, the angle α' of the disengagement ramps 115BS1 may be greater than the angle β' so that the resistive force provided by the retaining ring 106A in the axial direction is harder to overcome during disengagement than it is during engagement. In one aspect the angle α' may be provided such that a predetermined torsional and/or axial disengagement force is applied to the nut 101C for moving the nut 101C in the disassembly direction 399B relative to the union 100C effecting a radial spreading of the retaining ring 106A as the retaining ring 106A slides against the disengagement ramp 115BS1 of the shoulder portion 115B. As may be realized, the predetermined torsional and/or axial disengagement force may be provided through the use of simple tools, such as with a wrench, applied to the one or more flats 113B, 107B. In other aspects the angle α' may be such that movement of the nut 101C relative to the union 100C in the disengagement direction 399B may be provided substantially without tools.

As can be seen from the above description, the tube fitting 105B in accordance with the aspects of the disclosed embodiment provides a metal on elastomeric material seal, a tube fitting that can be assembled by hand, a tube fitting that includes a positive latching system that determines when a proper seal is made and substantially prevents the nut from disengaging the union 100B. The configuration of the tube fitting 105B as described above allows for assembly of the tube fitting 105B so that the sealing of the tube fitting may be performed in less than about 10 seconds. In other aspects the sealing of the tube fitting may be performed in more or less than about 10 seconds. The torque and/or axial force for assembling the tube fitting 105B is low allowing for a tool-less installation of the tube fitting 105B while substantially eliminating a need to look up predetermined fitting torque values and preventing over tightening of the tube fitting. The elastomeric sealing member 104B may compensate for fluctuation in the sealing surfaces of the union 100B and sleeve 102B. The sealing surfaces of the tube fitting 105B can also be repaired by replacing the elastomeric member 104B.

As described above with respect to the aspects of the disclosed embodiment, the snap coupling and mating snap coupling of each of the tube fittings 105, 105A, 105B are configured so that a disconnection force of the tube fitting is greater than a connection force of the tube fitting. For example, the torque needed to disengage the nut 101, 101A, 101C from the union 100, 100A, 100C is about 20 to about 300 times the torque needed to engage the nut 101, 101A, 101C with the union 100, 100A, 100C. In one aspect, the tube fitting 105, 105A, 105B is assembled by hand and without the use of tools. For example, a range of torque values from about 0.65 to about 28 inch-pounds would be required for assembling the tubing connections, depending on a size and application of the tubing. A range of torque values for disassembling the tubing connections ranges from about 70 to about 2000 inch-pounds, also depending on a size and application of the tubing.

In accordance with one or more aspects of the disclosed embodiment a tube fitting includes a first fitting member having a body including a shoulder portion; a second fitting member having a body including a gripping portion and a plurality of tines extending from the body, the plurality of tines being configured to engage the shoulder; and a third fitting member disposed between the first fitting member and second fitting member; and at least one elastomeric seal disposed between the first fitting member and the third fitting member.

In accordance with one or more aspects of the disclosed embodiment the first fitting member includes an internal passage formed through the body of the first fitting member; the second fitting member includes an internal passage formed through the body of the second fitting member; and the third fitting member includes a body having an internal passage and being configured to be at least partially inserted into a respective internal passage of each of the first and second fitting members.

In accordance with one or more aspects of the disclosed embodiment the body of the third fitting member includes a sealing surface; the internal passage of the first fitting member includes a mating sealing surface; and the at least one elastomeric seal includes a sealing member disposed between the sealing surface and the mating sealing surface. In accordance with one or more aspects of the disclosed embodiment the sealing surface of the third fitting member and the mating sealing surface are conical sealing surfaces and the at least one elastomeric seal includes a conical sealing member.

In accordance with one or more aspects of the disclosed embodiment the body of the third fitting member includes a flange portion having a sealing surface; the internal passage of the first fitting member includes a mating sealing surface; and the at least one elastomeric seal includes a sealing member disposed between the flange portion sealing surface and the mating sealing surface.

In accordance with one or more aspects of the disclosed embodiment the second fitting member is configured to engage the third fitting member and engagement between the first and second fitting members effects moving the third fitting member towards the first fitting member and compression of the at least one elastomeric seal.

In accordance with one or more aspects of the disclosed embodiment engagement of the plurality of tines with the shoulder is configured to produce one or more of a tactile, aural and visual indication that a predetermined compressive force is applied to the at least one elastomeric seal.

In accordance with one or more aspects of the disclosed embodiment the shoulder portion includes an angled engagement surface disposed at a first angle relative to an axis of the tube fitting and an angled disengagement surface disposed at a second angle relative to the axis, the first angle being different than the second angle; and each of the plurality of tines having a corresponding angled engagement surface and a corresponding angled disengagement surface; where the angled engagement surface and the corresponding angled engagement surface interface for assembly of the tube fitting and the angled disengagement surface and the corresponding angled disengagement surface interface to maintain a compressive force on the at least one elastomeric seal.

In accordance with one or more aspects of the disclosed embodiment the at least one elastomeric seal comprises a first and second elastomeric seal.

In accordance with one or more aspects of the disclosed embodiment each of the first and second elastomeric seal are configured to maintain at least partial system pressure within an internal passage of the tube fitting. In accordance with one or more aspects of the disclosed embodiment the second elastomeric seal is further configured to substantially prevent substance ingress to the first elastomeric seal.

In accordance with one or more aspects of the disclosed embodiment a hydraulic tubing joint includes first side and second side tubing members; a first fitting member coupled to the first side tubing member, the first fitting member having a body including a shoulder portion; a second fitting member having a body including a gripping portion and a plurality of tines extending from the body, the plurality of tines being configured to engage the shoulder; a third fitting member coupled to the second side tubing member, the third fitting member being disposed between the first fitting member and second fitting member; and at least one elastomeric seal disposed between the first fitting member and the third fitting member.

In accordance with one or more aspects of the disclosed embodiment the second fitting member includes an internal passage extending through the body of the second fitting member, where the second tubing member passes at least partially through the internal passage and the second fitting member is independently movable relative to at least the second tubing member and the third fitting member.

In accordance with one or more aspects of the disclosed embodiment the first fitting member includes an internal passage formed through the body of the first fitting member; the second fitting member includes an internal passage formed through the body of the second fitting member; and the third fitting member includes a body having an internal passage and being configured to be at least partially inserted into a respective internal passage of each of the first and second fitting members.

In accordance with one or more aspects of the disclosed embodiment the body of the third fitting member includes a sealing surface; the internal passage of the first fitting member includes a mating sealing surface; and the at least one elastomeric seal includes a sealing member disposed between the sealing surface and the mating sealing surface. In accordance with one or more aspects of the disclosed embodiment the sealing surface of the third fitting member and the mating sealing surface are conical sealing surfaces and the at least one elastomeric seal includes a conical sealing member.

In accordance with one or more aspects of the disclosed embodiment the body of the third fitting member includes a flange portion having a sealing surface; the internal passage of the first fitting member includes a mating sealing surface; and the at least one elastomeric seal includes a sealing member disposed between the flange portion sealing surface and the mating sealing surface.

In accordance with one or more aspects of the disclosed embodiment the second fitting member is configured to engage the third fitting member and engagement between the first and second fitting members effects moving the third fitting member towards the first fitting member and compression of the at least one elastomeric seal.

In accordance with one or more aspects of the disclosed embodiment engagement of the plurality of tines with the shoulder is configured to produce one or more of a tactile, aural and visual indication that a predetermined compressive force is applied to the at least one elastomeric seal.

In accordance with one or more aspects of the disclosed embodiment the shoulder portion includes an angled engagement surface disposed at a first angle relative to an axis of the tube fitting and an angled disengagement surface disposed at a second angle relative to the axis, the first angle being different than the second angle; and each of the plurality of tines having a corresponding angled engagement surface and a corresponding angled disengagement surface; where the angled engagement surface and the corresponding angled engagement surface interface for assembly of the tube fitting and the angled disengagement surface and the corresponding angled disengagement surface interface to maintain a compressive force on the at least one elastomeric seal.

In accordance with one or more aspects of the disclosed embodiment a method for connecting tubing is provided. The method includes aligning a first side tube fitting member with a second side tube fitting member; positioning at least one elastomeric seal member between the first and second side fitting members; moving the first side tube fitting member and the second side tube fitting member together to at least partially compress the at least one elastomeric seal member; engaging a third fitting member with the first side fitting member such that a seal formed by the at least one elastomeric seal member between the first side fitting member and the second side fitting is maintained through engagement between an angled surface of a tine portion of the third fitting member and an angled surface of a shoulder portion of the first side tube fitting.

In accordance with one or more aspects of the disclosed embodiment the method further includes providing, with at least the tine portion, one or more of a tactile, aural and visual indication that a predetermined compressive force is applied to the at least one elastomeric seal.

In accordance with one or more aspects of the disclosed embodiment engaging the third fitting member with the first side fitting member further compresses the at least one elastomeric seal member.

In accordance with one or more aspects of the disclosed embodiment a tube fitting includes a first coupling member having at least a snap coupling and a second coupling member having a first quick-connect side having a mating snap coupling disposed at a first end of the second coupling member, and a second quick-connect side configured for threaded engagement disposed at a second end of the second coupling member, the second end being opposite the first end; wherein the mating snap coupling is configured to engage the snap coupling to effect coupling of the first and second coupling member.

In accordance with one or more aspects of the disclosed embodiment the first coupling member includes a threaded portion configured to engage the second quick-connect side of the second coupling member.

In accordance with one or more aspects of the disclosed embodiment the tube fitting further includes at least one elastomeric seal disposed between the first coupling member and the second coupling member.

In accordance with one or more aspects of the disclosed embodiment the at least one elastomeric seal comprises a first and second elastomeric seal, each of the first and second elastomeric seal are configured to maintain at least partial system pressure within an internal passage of the tube fitting.

In accordance with one or more aspects of the disclosed embodiment the second elastomeric seal is further configured to substantially prevent substance ingress to the first elastomeric seal.

In accordance with one or more aspects of the disclosed embodiment the tube fitting further includes a third coupling member disposed between the first coupling member and the second coupling member wherein the at least one elastomeric seal is disposed on the third coupling member and configured to interface with the first coupling member.

In accordance with one or more aspects of the disclosed embodiment the second coupling member is configured to engage the third coupling member and engagement between the first and second coupling members effects moving the third coupling member towards the first coupling member and compression of the at least one elastomeric seal.

In accordance with one or more aspects of the disclosed embodiment the mating snap coupling includes a plurality of tines extending from the second coupling member and the snap coupling includes a shoulder configured to mate with the plurality of tines.

In accordance with one or more aspects of the disclosed embodiment the snap coupling and the mating snap coupling each include corresponding engagement surfaces which are configured to produce one or more of a tactile, aural and visual indication that a predetermined compressive force is applied for sealing the tube fitting.

In accordance with one or more aspects of the disclosed embodiment a tube fitting includes a first coupling member having at least a snap coupling, a sleeve member having at least one elastomeric seal disposed on the sleeve member and configured to interface with the first coupling member and a second coupling member having a quick-connect side with a mating snap coupling disposed at the quick-connect side, wherein the sleeve member is disposed between and retained by the first and second coupling members and the snap coupling and mating snap coupling effect coupling of the first and second coupling members.

In accordance with one or more aspects of the disclosed embodiment the snap coupling is a groove.

In accordance with one or more aspects of the disclosed embodiment the mating snap coupling is a groove and a ring member where the ring member is captured within the groove.

In accordance with one or more aspects of the disclosed embodiment the first coupling member and the sleeve member have a rigid tubing coupling portion.

In accordance with one or more aspects of the disclosed embodiment the second coupling member moves relative to the first coupling member and the sleeve member to effect connection of the tube fitting.

In accordance with one or more aspects of the disclosed embodiment the first coupling member includes an inner circumferential surface and the sleeve member includes an outer circumferential surface, where the at least one elastomeric seal is disposed between the outer circumferential surface and the inner circumferential surface to effect a seal between the first coupling member and the sleeve member.

In accordance with one or more aspects of the disclosed embodiment the snap coupling and mating snap coupling effect one or more of a tactile or aural indication of coupling between the first coupling member and the second coupling member.

In accordance with one or more aspects of the disclosed embodiment the sleeve member includes a visual indicator that produces a visual indication of coupling between the first coupling member and the second coupling member.

In accordance with one or more aspects of the disclosed embodiment further includes a decoupling member configured to engage the second coupling member and effect a release of the coupling of the first and second coupling members.

In accordance with one or more aspects of the disclosed embodiment a tube fitting includes a first fitting member having a body with a shoulder portion a second fitting member having a body and a snap coupling member included within the body, the snap coupling member being configured to engage the shoulder portion to effect coupling of the first and second fitting members a third fitting member disposed between the first fitting member and the second fitting member and at least one elastomeric seal disposed on the third fitting member and being configured to interface with the first fitting member.

In accordance with one or more aspects of the disclosed embodiment the first fitting member includes an internal passage formed through the body of the first fitting member the second fitting member includes an internal passage formed through the body of the second fitting member and the third fitting member includes a body having an internal passage and being configured to be at least partially inserted into a respective internal passage of each of the first and second fitting members.

In accordance with one or more aspects of the disclosed embodiment the body of the third fitting member includes an outer circumferential sealing surface the internal passage of the first fitting member includes an inner circumferential mating sealing surface and the at least one elastomeric seal includes a sealing member disposed between the outer circumferential sealing surface and the inner circumferential mating sealing surface.

In accordance with one or more aspects of the disclosed embodiment the coupling member includes a retaining ring configured to interface with the shoulder portion to maintain a longitudinal retention of the coupling of the first and second fitting members.

In accordance with one or more aspects of the disclosed embodiment the coupling member and shoulder portion effect one or more of a tactile or aural indication of coupling between the first fitting member and the second fitting member.

In accordance with one or more aspects of the disclosed embodiment the third fitting member includes a visual indicator that produces a visual indication of coupling between the first fitting member and the second fitting member.

In accordance with one or more aspects of the disclosed embodiment further includes a decoupling member configured to engage the second fitting member and effect a release of the coupling member from the shoulder portion.

In accordance with one or more aspects of the disclosed embodiment a method for connecting tubing is provided. The method includes aligning a first side tube fitting member with a second side tube fitting member positioning at least one elastomeric seal member on the second side tube fitting member moving the first side tube fitting member and the second side tube fitting member together to at least partially compress the at least one elastomeric seal member radially between the first and second side tube fitting members and engaging a third fitting member with the first side tube fitting member such that a seal, formed by the at least one elastomeric seal member between the first side tube fitting member and the second side tube fitting member, is maintained through engagement of a coupling member of the third side tube fitting member and a shoulder portion of the first side tube fitting member.

In accordance with one or more aspects of the disclosed embodiment the method further includes providing one or more of a tactile, aural and visual indication of coupling between the first side tube fitting member and the second side tube fitting member.

In accordance with one or more aspects of the disclosed embodiment engaging the third side tube fitting member with the first side tube fitting member maintains a longitudinal retention of the first and second side tube fitting members.

In accordance with one or more aspects of the disclosed embodiment the at least one elastomeric seal is radially compressed between an inner circumferential sealing surface of the first side fitting tube member and an outer circumferential sealing surface of the second side tube fitting member.

In accordance with one or more aspects of the disclosed embodiment a tube fitting includes a first coupling member having at least a snap coupling; a second coupling member having a first quick-connect side with a mating snap coupling disposed at a first end of the second coupling member, and at least one elastomeric seal disposed on the second coupling member; and a sleeve member configured to interface with the first coupling member and the at least one elastomeric seal; wherein the sleeve member is disposed between and retained by the first coupling member and the second coupling member and the snap coupling and mating snap coupling effect coupling of the first coupling member and the second coupling member.

In accordance with one or more aspects of the disclosed embodiment the mating snap coupling is a groove.

In accordance with one or more aspects of the disclosed embodiment the snap coupling is a groove and a ring member where the ring member is captured within the groove.

In accordance with one or more aspects of the disclosed embodiment the second coupling member and the sleeve member have a rigid tubing coupling portion.

In accordance with one or more aspects of the disclosed embodiment one or more of the first coupling member and the second coupling member move relative to another one of the first coupling member and the second coupling member and the sleeve member to effect connection of the tube fitting, and the snap coupling and mating snap coupling are configured so that a disconnection force of the tube fitting is greater than a connection force of the tube fitting.

In accordance with one or more aspects of the disclosed embodiment the second coupling member includes an inner circumferential surface; and the sleeve member includes an outer circumferential surface; where the at least one elastomeric seal is disposed between the outer circumferential surface and the inner circumferential surface to effect a seal between the second coupling member and the sleeve member.

In accordance with one or more aspects of the disclosed embodiment the snap coupling and mating snap coupling effect one or more of a tactile or aural indication of coupling between the first coupling member and the second coupling member.

In accordance with one or more aspects of the disclosed embodiment the sleeve member includes a visual indicator that produces a visual indication of coupling between the first coupling member and the second coupling member.

In accordance with one or more aspects of the disclosed embodiment the second coupling member includes a second quick-connect side configured for threaded engagement, the second quick connect side being disposed at a second end of the second coupling member where the second end is opposite the first end.

In accordance with one or more aspects of the disclosed embodiment a tube fitting includes a first fitting member having a body with a shoulder portion; a second fitting member having a body and a snap coupling member included within the body, the snap coupling member being configured to engage the shoulder portion to effect coupling of the first and second fitting members; a third fitting member disposed between the first fitting member and the second fitting member; and at least one elastomeric seal disposed on the first fitting member and being configured to interface with the third fitting member.

In accordance with one or more aspects of the disclosed embodiment the first fitting member includes an internal passage formed through the body of the first fitting member; the second fitting member includes an internal passage formed through the body of the second fitting member; and the third fitting member includes a body having an internal passage and being configured to be at least partially inserted into a respective internal passage of each of the first and second fitting members.

In accordance with one or more aspects of the disclosed embodiment the body of the third fitting member includes an outer circumferential sealing surface; the internal passage of the first fitting member includes an inner circumferential mating sealing surface; and the at least one elastomeric seal includes a sealing member disposed between the outer circumferential sealing surface and the inner circumferential mating sealing surface.

In accordance with one or more aspects of the disclosed embodiment the snap coupling member includes a retaining ring configured to interface with the shoulder portion to maintain a longitudinal retention of the coupling of the first and second fitting members.

In accordance with one or more aspects of the disclosed embodiment the snap coupling member and shoulder portion effect one or more of a tactile or aural indication of coupling between the first fitting member and the second fitting member.

In accordance with one or more aspects of the disclosed embodiment the third fitting member includes a visual indicator that produces a visual indication of coupling between the first fitting member and the second fitting member.

In accordance with one or more aspects of the disclosed embodiment the first fitting member includes a quick-connect portion and the second fitting member includes a mating quick-connect portion configured for threaded engagement with the quick-connect portion.

In accordance with one or more aspects of the disclosed embodiment a method for connecting tubing includes aligning a first side tube fitting member with a second side tube fitting member; positioning at least one elastomeric seal member on the first side tube fitting member; moving the first side tube fitting member and the second side tube fitting member together to at least partially compress the at least one elastomeric seal member radially between the first and second side tube fitting members; and engaging a third fitting member with the first side tube fitting member such that a seal, formed by the at least one elastomeric seal member between the first side tube fitting member and the second side tube fitting member, is maintained through engagement of a coupling member of the third fitting member and a shoulder portion of the first side tube fitting member.

In accordance with one or more aspects of the disclosed embodiment the method further includes providing one or more of a tactile, aural and visual indication of coupling between the first side tube fitting member and the third fitting member.

In accordance with one or more aspects of the disclosed embodiment engaging the third fitting member with the first side tube fitting member maintains a longitudinal retention of the first and second side tube fitting members from moving apart.

In accordance with one or more aspects of the disclosed embodiment the at least one elastomeric seal is radially compressed between an inner circumferential sealing surface of the first side tube fitting member and an outer circumferential sealing surface of the second side tube fitting member.

In accordance with one or more aspects of the disclosed embodiment a tube fitting includes a first coupling member having at least a snap coupling; a second coupling member having a first quick-connect side with a mating snap coupling disposed at a first end of the second coupling member; and a sleeve member configured to interface with the first coupling member and at least one elastomeric seal; wherein the sleeve member is disposed between and retained by the first coupling member and the second coupling member and the snap coupling and mating snap coupling effect coupling of the first coupling member and the second coupling member so that a disconnection force of the tube fitting is greater than a connection force of the tube fitting.

In accordance with one or more aspects of the disclosed embodiment the tube fitting wherein the at least one elastomeric seal disposed on the second coupling member.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A tube fitting comprising:
a first coupling member having at least a retaining wire snap coupling;
a second coupling member having
a first quick-connect side with a mating snap coupling disposed at a first end of the second coupling member, and
an elastomeric seal interface surface disposed on the second coupling member and configured to receive at least one elastomeric seal; and
a monolithic sleeve member configured to interface with the first coupling member and where the at least one elastomeric seal is disposed on the monolithic sleeve member and engages the elastomeric seal interface surface of the second coupling member; and
wherein the monolithic sleeve member is disposed between and retained by the first coupling member and the second coupling member and, wherein the first coupling member, including the retaining wire snap coupling, and the second coupling member, including the mating snap coupling, are configured to effect coupling of the first coupling member and the second coupling member, and
wherein the second coupling member includes an inner circumferential surface, the monolithic sleeve member includes an outer circumferential surface, and where the at least one elastomeric seal is disposed between the outer circumferential surface and the inner circumferential surface to effect a seal between the second coupling member and the monolithic sleeve member.

2. The tube fitting of claim 1, wherein the mating snap coupling is a groove.

3. The tube fitting of claim 1, wherein the retaining wire snap coupling is a groove and a ring member where the ring member is captured within the groove.

4. The tube fitting of claim 1, wherein the second coupling member and the monolithic sleeve member have a rigid tubing coupling portion.

5. The tube fitting of claim 1, wherein
one or more of the first coupling member and the second coupling member move relative to another one of the first coupling member and the second coupling member and the monolithic sleeve member to effect connection of the tube fitting, and
the snap coupling and mating snap coupling are configured so that a disconnection force of the tube fitting is greater than a connection force of the tube fitting.

6. The tube fitting of claim 1, wherein the snap coupling and mating snap coupling effect one or more of a tactile or aural indication of coupling between the first coupling member and the second coupling member.

7. The tube fitting of claim 1, wherein the monolithic sleeve member includes a visual indicator that produces a visual indication of coupling between the first coupling member and the second coupling member.

8. The tube fitting of claim 1, wherein:
the first coupling member includes a first shoulder that extends radially inward into an internal passage of the first coupling member; and
the monolithic sleeve member includes a second shoulder that extends radially outward from a body of the monolithic sleeve member, the first shoulder being configured to engage the second shoulder so that the monolithic sleeve member is held in coupling engagement with the second coupling member.

9. The tube fitting of claim 1, wherein the at least one elastomeric seal is a multi-part seal.

10. The tube fitting of claim 9, wherein the multi-part seal comprises an O-ring seal and one or more ancillary O-ring seal.

11. The tube fitting of claim 10, wherein the one or more ancillary O-ring seal comprises a durometer that is greater than another durometer of the O-ring seal.

12. The tube fitting of claim 1, further comprising a longitudinal axis, where the monolithic sleeve member is longitudinally disposed between the first coupling member and the second coupling member so as to be retained from movement along the longitudinal axis by the first coupling member and the second coupling member.

13. A tube fitting comprising:
a first fitting member having a body with a shoulder portion and an internal passage formed through the body of the first fitting member;
a second fitting member having a body, a retaining wire snap coupling member movably retained within the body, and an internal passage formed through the body of the second fitting member, the snap coupling member being distinct from the body and being configured to engage the shoulder portion where the first fitting member, having the shoulder portion, and the second fitting member, having the retaining wire snap coupling member are configured so as to effect coupling of the first and second fitting members;
a monolithic third fitting member disposed between the first fitting member and the second fitting member, the monolithic third fitting member includes a body having an internal passage and being configured to be at least partially inserted into a respective internal passage of each of the first fitting member and the second fitting member; and at least one elastomeric seal disposed on the monolithic third fitting member and being configured to interface with the first fitting member;

wherein the body of the monolithic third fitting member includes an outer circumferential sealing surface, the internal passage of the first fitting member includes an inner circumferential mating sealing surface; and the at least one elastomeric seal includes a sealing member disposed between the outer circumferential sealing surface and the inner circumferential mating sealing surface.

14. The tube fitting of claim 13, wherein the retaining wire snap coupling member includes a retaining ring configured to interface with the shoulder portion to maintain a longitudinal retention of the coupling of the first fitting member and the second fitting member, where the retaining wire snap coupling member and the shoulder portion are configured so that a disconnection force of the tube fitting is greater than a connection force of the tube fitting.

15. The tube fitting of claim 13, wherein the snap coupling member and shoulder portion effect one or more of a tactile or aural indication of coupling between the first fitting member and the second fitting member.

16. The tube fitting of claim 13, wherein the third fitting member includes a visual indicator that produces a visual indication of coupling between the first fitting member and the second fitting member.

17. The tube fitting of claim 13, further comprising a longitudinal axis, where the monolithic third fitting member is longitudinally disposed between the first fitting member and the second fitting member so as to be retained from movement along the longitudinal axis by the first fitting member and the second fitting member.

18. The tube fitting of claim 13, wherein the at least one elastomeric seal is a multi-part seal.

19. The tube fitting of claim 18, wherein the multi-part seal comprises an O-ring seal and one or more ancillary O-ring seal.

20. The tube fitting of claim 19, wherein the one or more ancillary O-ring seal comprises a durometer that is greater than another durometer of the O-ring seal.

* * * * *